United States Patent
Zhang

(10) Patent No.: US 9,995,228 B2
(45) Date of Patent: *Jun. 12, 2018

(54) ENGINE EXHAUST SYSTEM

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

This patent is subject to a terminal disclaimer.

(21) Appl. No.: 15/063,673

(22) Filed: Mar. 8, 2016

(65) Prior Publication Data

US 2017/0260915 A1 Sep. 14, 2017

(51) Int. Cl.
| | |
|---|---|
| *F02B 33/44* | (2006.01) |
| *F02M 25/07* | (2006.01) |
| *F01N 5/00* | (2006.01) |
| *F01N 3/00* | (2006.01) |
| *F02D 41/00* | (2006.01) |
| *F01N 13/00* | (2010.01) |
| *F02M 26/07* | (2016.01) |
| *F02M 26/71* | (2016.01) |
| *F01N 13/10* | (2010.01) |

(Continued)

(52) U.S. Cl.
CPC ....... *F02D 41/0007* (2013.01); *F01N 13/009* (2014.06); *F01N 13/10* (2013.01); *F02B 37/18* (2013.01); *F02D 9/02* (2013.01); *F02M 26/07* (2016.02); *F02M 26/71* (2016.02); *F02D 2041/0017* (2013.01); *Y02T 10/144* (2013.01)

(58) Field of Classification Search
CPC ............... F02D 41/0007; F02D 9/02; F02D 2041/0017; F01N 13/009; F01N 13/10; F02M 26/07; F02M 26/71; F02B 37/18
USPC .................. 60/605.2, 281, 286; 701/108
See application file for complete search history.

(56) References Cited

U.S. PATENT DOCUMENTS 6,082,100 A * 7/2000 Boegner ............... F01N 3/0814
60/286
6,973,786 B1 12/2005 Liu et al.
(Continued)

OTHER PUBLICATIONS

Zhang, Xiaogang, "Exhaust System," U.S. Appl. No. 14/724,109, filed May 28, 2015, 37 pages.

*Primary Examiner* — Thai Ba Trieu
(74) *Attorney, Agent, or Firm* — Julia Voutyras; McCoy Russell LLP

(57) ABSTRACT

Methods and systems are provided for flowing exhaust gas in an exhaust system of an engine. In one example, a method may include flowing a first portion of exhaust gas to a turbine, from the turbine to at least one aftertreatment device, then from the at least one aftertreatment device to atmosphere, and flowing a second portion of exhaust gas to the at least one aftertreatment device, bypassing the turbine, then from the aftertreatment device to atmosphere, during a second condition. The method may also include, during a second condition, flowing a third portion of exhaust gas to the at least one aftertreatment device, from the at least one aftertreatment device to the turbine, and then from the turbine to atmosphere, and flowing a fourth portion of exhaust gas to the at least one aftertreatment device, and then from the at least one aftertreatment device to atmosphere, bypassing the turbine.

18 Claims, 13 Drawing Sheets

(51) Int. Cl.
    *F02B 37/18*    (2006.01)
    *F02D 9/02*     (2006.01)

(56)        References Cited

U.S. PATENT DOCUMENTS 7,168,250  B2     1/2007  Wei et al.
    7,444,804  B2    11/2008  Hashizume
    8,276,366  B2 *  10/2012  Bennet .................... F01N 3/021
                                                            60/605.2
    8,789,367  B2     7/2014  Robel
    9,097,176  B2 *   8/2015  Hayashi ................. F02B 37/18
    9,593,619  B2 *   3/2017  Zhang .................... F01N 13/08
 2006/0021346  A1     2/2006  Whelan et al.
 2011/0000470  A1 *   1/2011  Roth ...................... F02M 26/07
                                                            123/568.11
 2011/0061380  A1     3/2011  Leroux et al.
 2014/0190161  A1 *   7/2014  Hayashi ................. F02B 37/18
                                                            60/602

* cited by examiner

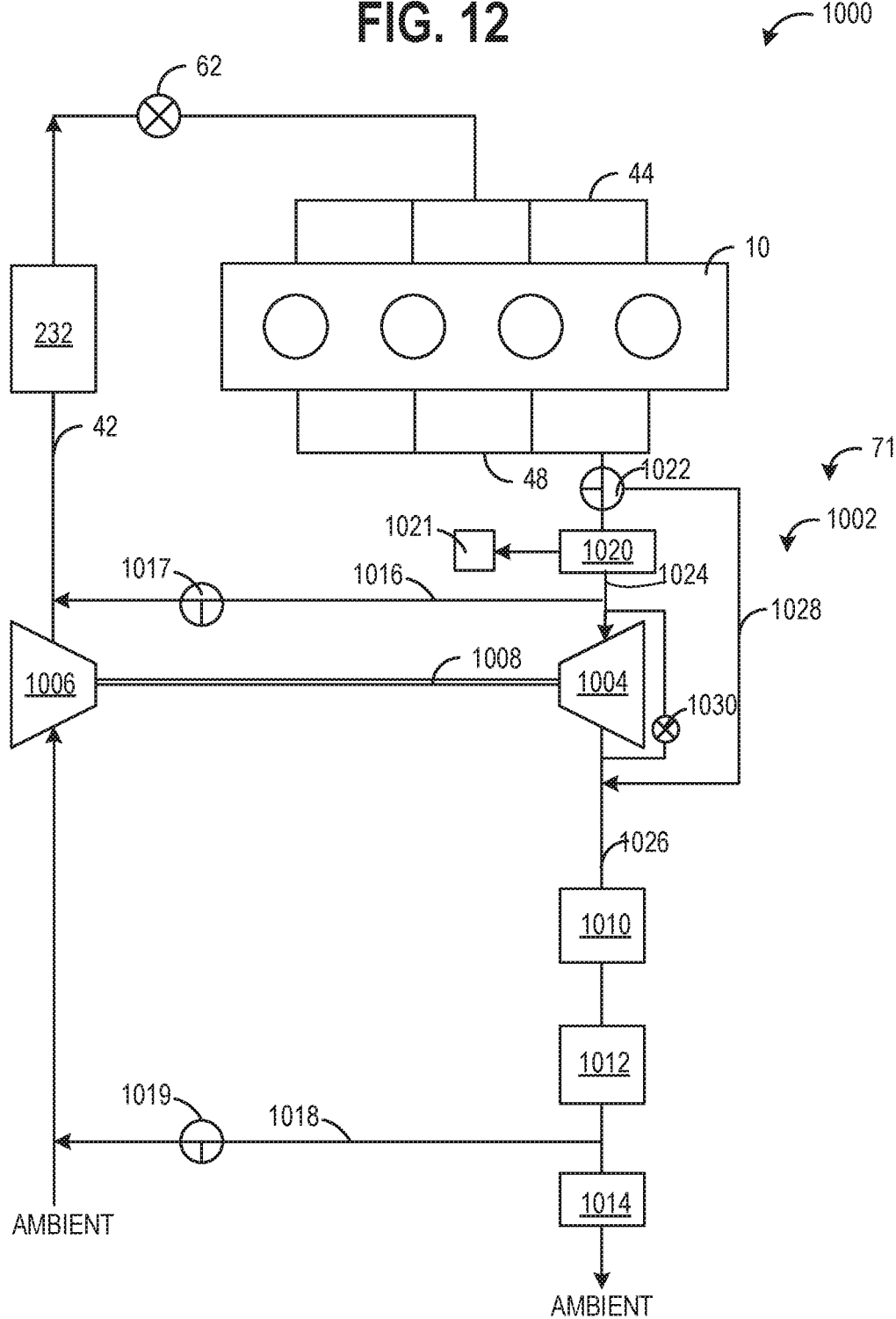

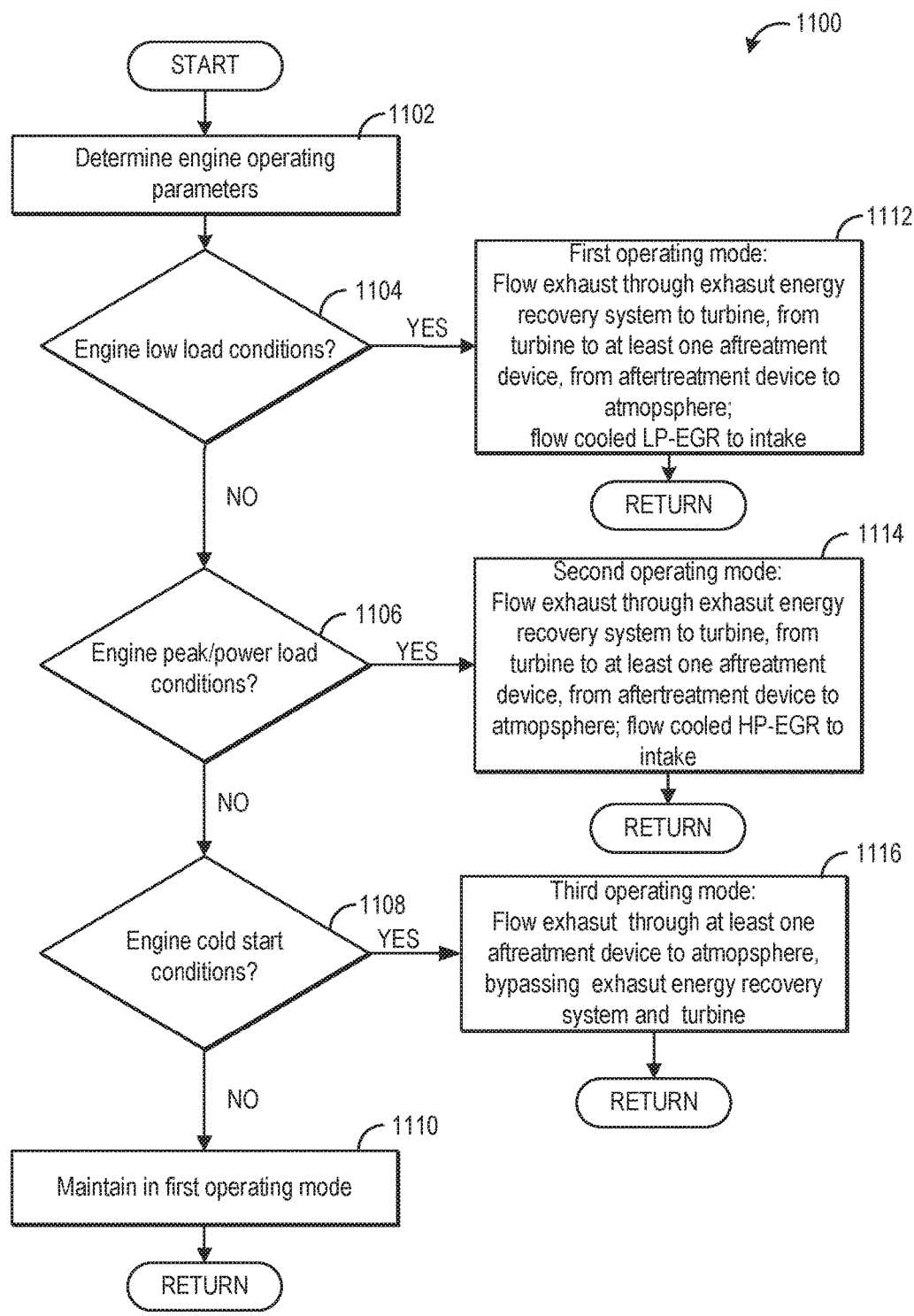

ENGINE EXHAUST SYSTEM

FIELD

The present description relates generally to methods and systems for controlling exhaust flow in an engine exhaust system.

BACKGROUND/SUMMARY

Engine exhaust systems for turbocharged engines commonly include the turbocharger arranged upstream in an exhaust flow direction from the exhaust aftertreatment devices (e.g., catalysts). Such an arrangement, while suitable for fast turbocharger response during some conditions, can lead to increased emissions during cold start conditions due to exhaust heat loss through the turbine of the turbocharger. Further, the exhaust backpressure created by the aftertreatment devices results in increased turbine outlet pressure, reducing the efficiency of the turbocharger.

Other attempts to address the issue of compromised emissions due to heat loss through the turbine include an aftertreatment device closely coupled to the engine. One example approach is shown by Bennet et al. in U.S. Pat. No. 8,276,366. Therein, a plurality of aftertreatment devices are coupled in a housing having multiple flow paths to allow flow of exhaust through one or more of the aftertreatment devices and a turbine of a twin turbocharger. Depending on operating conditions, the exhaust may flow through a turbine prior to flowing through one or more of the aftertreatment devices, or the exhaust may flow through one of the aftertreatment devices prior to flowing through a turbine.

However, the inventors herein have recognized potential issues with such systems. As one example, in every possible flow path in the housing of Bennet, exhaust always flows through at least one aftertreatment device after flowing through a turbine. Thus, the system of Bennet still suffers from the increased turbine outlet pressure that results from subsequent exhaust flow through downstream aftertreatment devices. As a further example, when a flow path is selected that routes exhaust from the engine directly to a turbine and then through one or more aftertreatment devices, it results in one of the aftertreatment devices (an oxidation catalyst) being bypassed altogether. Thus, at least in some examples, emissions may still be comprised. Further still, in Bennet, exhaust always flows through a turbine before flowing through a particulate filter, and thus particulate matter may impinge on the turbine blades, eventually leading to turbine degradation.

In one example, the issues described above may be addressed by a method for an exhaust system of an engine, including during a first condition, flowing a first portion of exhaust gas to a turbine, from the turbine to at least one aftertreatment device, then from the at least one aftertreatment device to atmosphere, and flowing a second portion of exhaust gas to the at least one aftertreatment device, bypassing the turbine, then from the aftertreatment device to atmosphere. The method further includes, during a second condition, flowing a third portion of exhaust gas to the at least one aftertreatment device, from the at least one aftertreatment device to the turbine, and then from the turbine to atmosphere, and flowing a fourth portion of exhaust gas to the at least one aftertreatment device, and then from the at least one aftertreatment device to atmosphere, bypassing the turbine.

In one example, the first condition may include engine output above a first threshold output, for example, during engine peak power and/or load conditions. The second condition may include engine output below a second threshold output, for example, during an idle engine condition. In this way, responsive to peak power and/or load conditions, the exhaust system may be operated to provide desired turbine response during engine peak load conditions by flowing exhaust gas to the turbine, and simultaneously reducing the turbine load to prevent turbine over-speeding by directing at least a part of exhaust gas to the at least one aftertreatment device, bypassing the turbine. Additionally, responsive to the idle engine conditions, the exhaust system may be operated to ensure adequate catalyst warm-up to reduce emissions by flowing exhaust through the at least one aftertreatment device, and simultaneously directing at least a portion of exhaust to flow from the at least one aftertreatment device to atmosphere, bypassing the turbine, reducing pumping losses.

In both the first and second conditions, at least some exhaust still flows through the turbine and all exhaust still flows through the at least one aftertreatment device, and thus no trade-off between emissions and turbine response is required. Further, by maintaining the turbocharger physically between the engine and the at least one aftertreatment device, packaging challenges that result from placing the aftertreatment devices before the turbocharger can be avoided. Further still, if the at least one aftertreatment device includes a particulate filter, by flowing exhaust through the particulate filter before the turbine, at least during some conditions, particulate matter impingement on the turbine may be reduced, increasing the life of the turbine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 12 illustrates another embodiment of an exhaust system.

FIG. 13 is a flow chart illustrating a method for determining a mode of operation for the exhaust system of FIG. 12.

DETAILED DESCRIPTION

The following description relates to systems and methods for operating an exhaust system of an engine in different modes, depending on engine operating conditions. The exhaust system includes a plurality of exhaust passages and three-way valves to direct flow of exhaust through a turbine of a turbocharger and a plurality of aftertreatment devices. The exhaust system may be operated in a first standard mode of operation during which exhaust flows through the exhaust system via a first flow path. In the first flow path, exhaust flows through the turbine of the turbocharger prior to flowing through one or more downstream aftertreatment devices. The exhaust system may be operated in the first standard mode when rapid turbocharger response is desired, such as in response to an operator tip-in (e.g., vehicle or engine acceleration event) and/or during standard, steady-state operating conditions where the engine is operating below peak output, the aftertreatment devices have reached light-off temperature, engine particulate matter production is below a threshold, etc.

In contrast, the exhaust system may be operated in a second standard mode of operation when the exhaust flows through the exhaust system via a second flow path. In the second flow path, a first portion of the exhaust flows through the turbine of the turbocharger prior to flowing through one or more downstream aftertreatment devices, while a second portion of the exhaust bypasses the turbine, flowing directly to one or more aftertreatment devices. The exhaust system may be operated in the second standard mode of operation during engine peak power and/or load conditions, to reduce load on the turbine.

The exhaust system may operate in a first bypass mode of operation where exhaust flows along a third flow path. In the third flow path, exhaust directly flows to at least one aftertreatment device, and from the at least one aftertreatment device flows to the turbine. The exhaust system may be operated in the first bypass mode when rapid aftertreatment device warm-up is desired, such as during engine cold start conditions, and/or when engine particulate matter production is above a threshold, to remove the particulate matter from the exhaust via the at least one aftertreatment device before the exhaust travels to the turbine.

A second bypass mode of operation may be executed when the engine is idle. During the second bypass mode, exhaust flows through a fourth flow path, where the exhaust flows to the at least one aftertreatment device and then a first portion of the exhaust flows from the at least one aftertreatment device to the turbine and a second portion of exhaust flows from the at least one aftertreatment device to atmosphere, thereby decreasing pumping losses by decreasing exhaust flow to the turbine during the idle engine condition.

Figure 1:
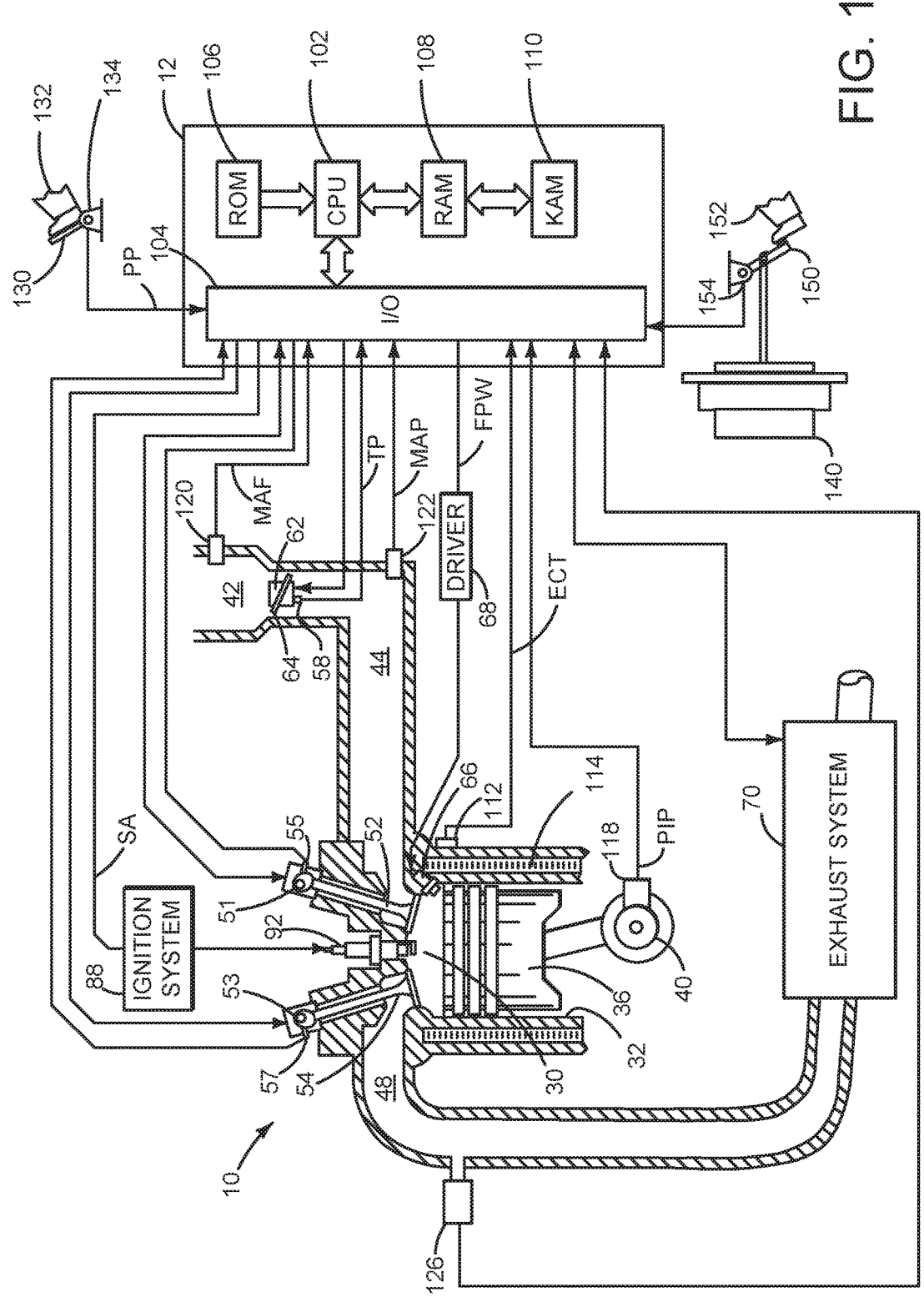
FIG. 1 shows a single cylinder of a multi-cylinder engine.
Figure 2:
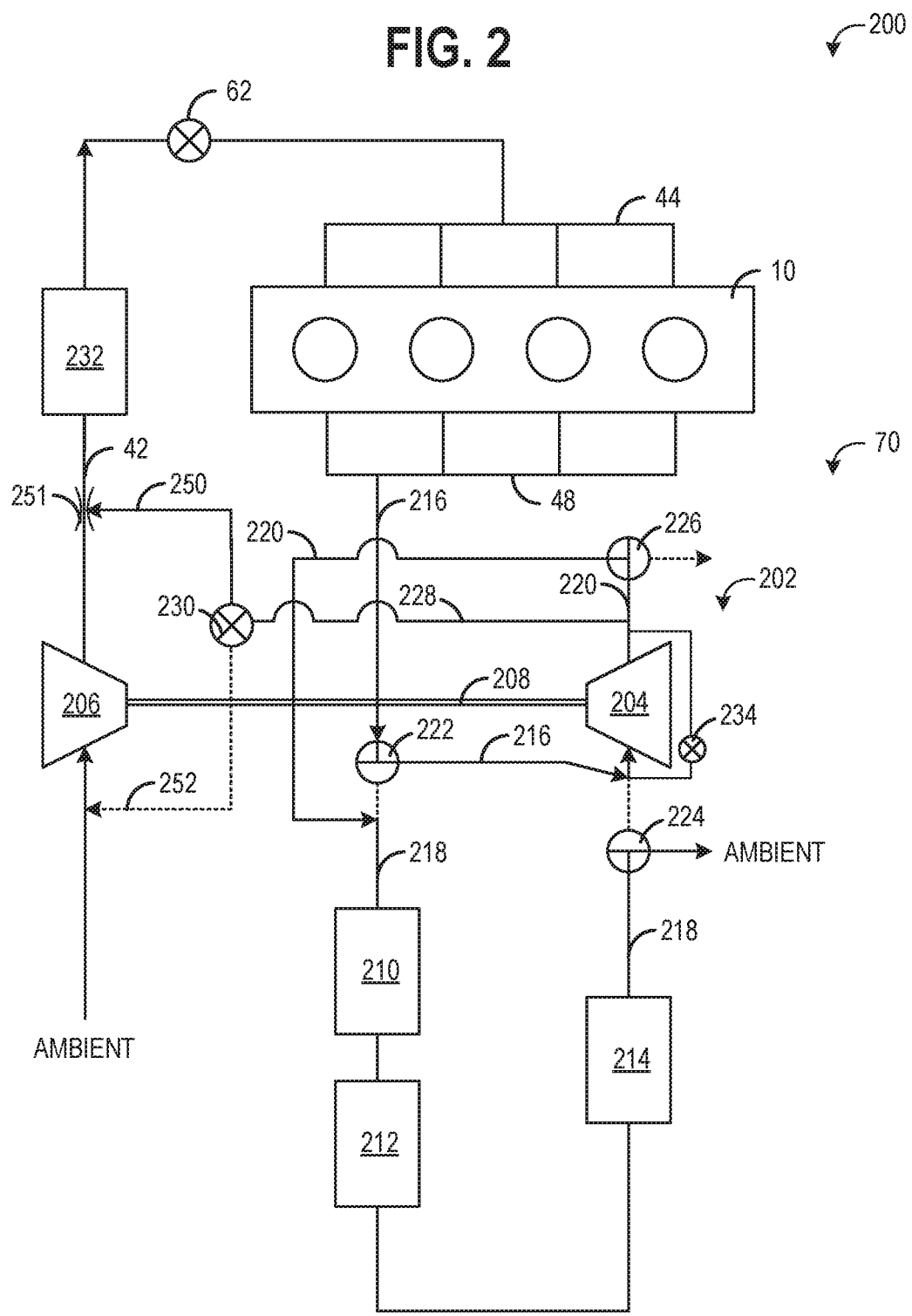
FIG. 2 schematically shows an exhaust system coupled to the multi-cylinder engine of FIG. 1 in a first operating mode.
Figure 3:
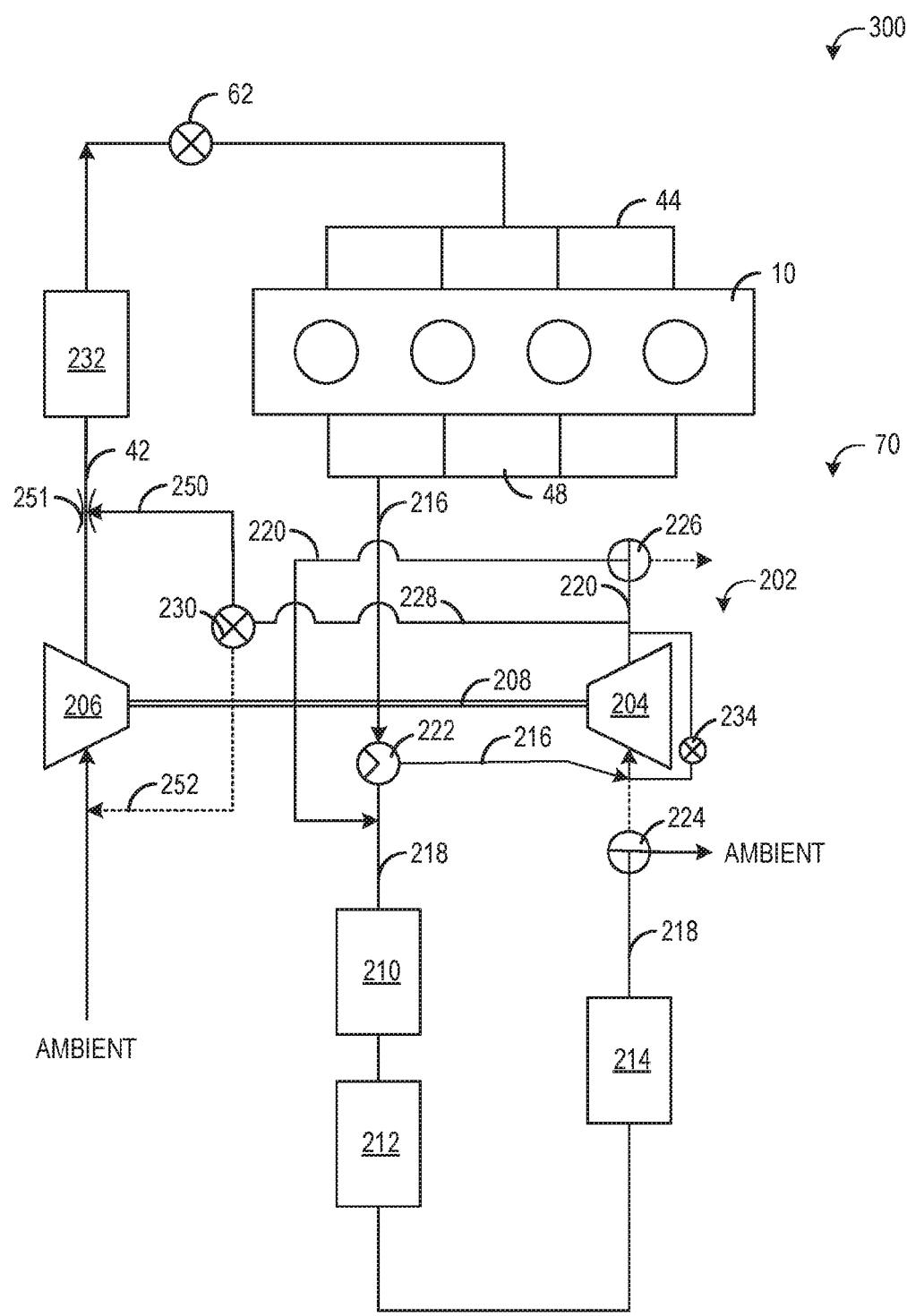
FIG. 3 shows the exhaust system of FIG. 2 in a second operating mode.
Figure 4:
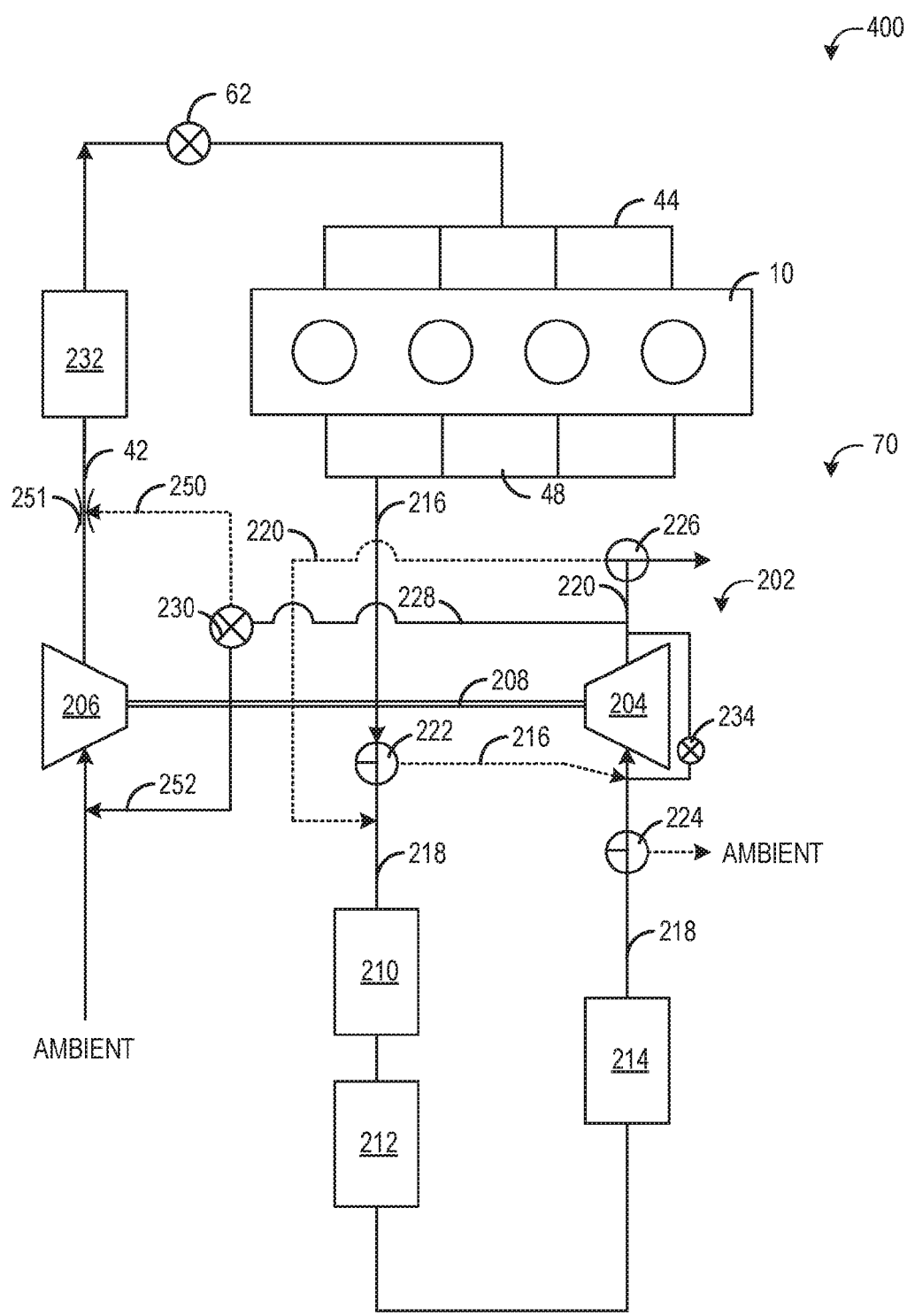
FIG. 4 shows the exhaust system of FIG. 2 in a third operating mode.
Figure 5:
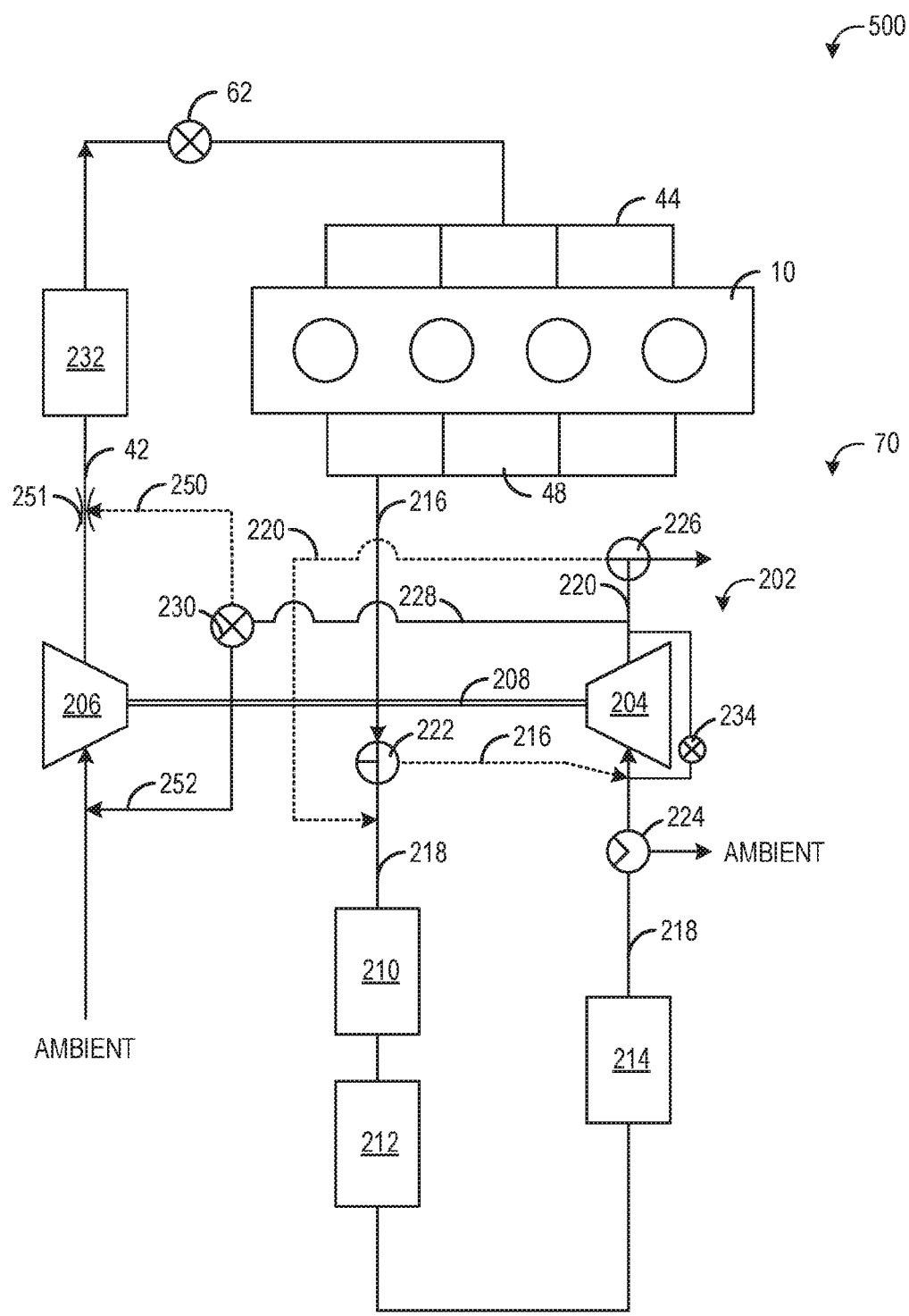
FIG. 5 shows the exhaust system of FIG. 2 in a fourth operating mode.

FIG. 1 shows a single cylinder of a multi-cylinder engine that is coupled to an exhaust system, such as the exhaust system described above. FIGS. 2 and 3 show the exhaust system during the first standard mode and during the second standard mode of operation, respectively. The first bypass mode of operation is shown in FIG. 4, and FIG. 5 shows a second bypass mode of operation. FIGS. 6-10 illustrate methods regulating the flow of exhaust during the operating modes of FIGS. 2-5. FIGS. 11 and 12 show additional embodiments of the exhaust system coupled to an engine and FIG. 13 illustrates a method for operating the exhaust system of FIG. 12. The engine and exhaust system of FIGS. 1-13 may be controlled by a control unit, such as the controller of FIG. 1. The controller may store in memory instructions executable to carry out one or more methods to control the exhaust system, such as the methods illustrated in FIGS. 6-10 and FIG. 13.

FIGS. 1-5, 11, and 12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68, which responds to controller 12. In addition, intake manifold 44 is shown communicating with optional electronic throttle 62, which adjusts a position of throttle plate 64 to control airflow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. However, in examples where compression ignition is utilized, the ignition system 88 may be dispensed with. Universal Exhaust Gas Oxygen (UEGO) sensor 126 is shown coupled to exhaust manifold 48 upstream of an exhaust system 70, which will be described in more detail with respect to FIGS. 2-5, 11, and 12. Alternatively, a two-state exhaust gas oxygen sensor may be substituted for UEGO sensor 126.

During operation, each cylinder within engine 10 typically undergoes a four-stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC). During the compression stroke, intake valve 52 and exhaust valve 54 are closed. Piston 36 moves toward the cylinder head to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples. Further, the engine may be a compression ignition engine configured to operate with diesel fuel, for example, and thus during operation ignition via spark plug 92 may be dispensed with.

Vehicle wheel brakes or regenerative braking via a driveline integrated starter/generator (DISG) may be provided when brake pedal 150 is applied via foot 152. Brake pedal sensor 154 supplies a signal indicative of brake pedal position to controller 12. Foot 152 is assisted by brake booster 140 applying vehicle brakes.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined. Controller 12 may also receive signals from sensors located in exhaust system 70 and/or may trigger one or more actuators of exhaust system 70.

The controller 12 receives signals from the various sensors of FIG. 1 (as well as FIGS. 2-5, and FIGS. 11 and 12, described below) and employs the various actuators of FIG. 1 and FIGS. 2-5, FIGS. 11-12, to adjust engine operation based on the received signals and instructions stored on a memory of the controller. In one example, controller 12 may receive signals from temperature sensor 112, position sensor 134, Hall effect sensor 118, MAP sensor 122, MAF sensor 120, and/or other sensors, and based on the signals from the sensors, determine whether to operate the exhaust system 70 in a standard or bypass mode of operation and consequently trigger one or more actuators based on the determined mode of operation. For example, controller 12 may move a plurality of three-way valves of FIGS. 2-5, and FIGS. 11-12 into respective set positions based on the determined mode of operation, as described in more detail below. Further, controller 12 may actuate a wastegate of a turbocharger, described below, to provide desired boost pressure.

FIG. 2 schematically illustrates the exhaust system 70 of FIG. 1 in a first standard mode 200. As explained above with respect to FIG. 1, engine 10 includes a plurality of cylinders, herein depicted as four cylinders arranged in-line, although other configurations are possible. Engine 10 receives intake air via intake manifold 44 and exhausts exhaust gas via exhaust manifold 48. Exhaust system 70 includes a turbocharger 202 including a compressor 206 arranged in intake passage 42, and an exhaust turbine 204 arranged along an exhaust passage (specifically, at a junction between a first passage 216 and a third passage 220, described in more detail below). Compressor 206 may be at least partially powered by exhaust turbine 204 via a shaft 208. A charge air cooler (CAC) 232 may be positioned in intake passage 42, downstream of compressor 206, for cooling the boosted air charge prior to delivery to the engine cylinders. Throttle 62 is provided along the intake passage of the engine for varying the flow rate and/or pressure of intake air provided to the engine cylinders. For example, throttle 62 may be disposed downstream of compressor 206 as shown in FIG. 2, or alternatively may be provided upstream of compressor 206.

Some or all of the exhaust gases may bypass the turbine 204 via a turbine bypass passage controlled by a wastegate valve 234. An inlet of the wastegate valve 234 may be fluidically coupled to the first passage 216, downstream of a first three-way valve 222 (described below) and upstream of the turbine 204. The first passage 216 may receive exhaust directly from the exhaust manifold and may direct exhaust through the first three way valve along the first passage to the turbine and/or to the wastegate valve 234. An outlet of the wastegate valve 234 may be fluidically coupled to the third passage 220, downstream of the turbine and downstream of an EGR passage 228. The inlet of the wastegate valve 234 may also be fluidically coupled to the second passage 218 downstream of the second three-way valve 224. However, in some examples the wastegate valve 234 may be dispensed with, and all turbine speed control may be provided by the first three-way valve 222, as described below.

Exhaust system 70 includes one or more exhaust aftertreatment devices. As illustrated, exhaust system 70 includes a first aftertreatment device 210, a second aftertreatment device 212, and a third aftertreatment device 214. The aftertreatment devices may include one or more of a three-way catalyst (TWC), hydrocarbon trap, particulate filter, muffler, oxidation catalyst, lean NOx trap (LNT), selective catalytic reduction (SCR) system, or other suitable aftertreatment device. In one specific example, engine 10 may be a gasoline engine and first aftertreatment device 210 may be a TWC, second aftertreatment device 212 may be an underbody converter, and third aftertreatment device 214 may be a muffler. In another specific example, engine 10 may be a diesel engine and first aftertreatment device 210 may be a diesel oxidation catalyst, second aftertreatment device 212 may be a diesel particulate filter, and third aftertreatment device 214 may be an SCR/LNT. The examples provided above are non-limiting, and other configurations are possible.

Exhaust system 70 further includes a plurality of exhaust passages and three-way valves to direct flow of exhaust through the turbine 204 and plurality of aftertreatment devices. Exhaust manifold 48 is fluidically coupled to first passage 216. First passage 216 has an inlet coupled to exhaust manifold 48 and an outlet coupled to an inlet of turbine 204. Thus, first passage 216 is configured to direct exhaust gas directly from exhaust manifold 48 to turbine 204, at least under some conditions.

First passage 216 includes the first three-way valve 222 at a junction between first passage 216 and a second passage 218. Second passage 218 has an inlet fluidically coupled to first passage 216 via first three-way valve 222 and an outlet fluidically coupled to the inlet of turbine 204. The aftertreatment devices 210, 212, and 214 are each disposed along second passage 218. Second passage 218 further includes a second three-way valve 224 coupling second passage 218 to atmosphere. Thus, second passage 218 is configured to direct exhaust gas received from first passage 216 via first three-way valve 222 through each of the aftertreatment devices and either to atmosphere or to the inlet of turbine 204.

An outlet of the turbine 204 is fluidically coupled to a third passage 220. Third passage 220 has an inlet fluidically coupled to the outlet of the turbine 204 and an outlet fluidically coupled to second passage 218. The outlet of third passage 220 is coupled to second passage 218 upstream of first aftertreatment device 210 and downstream of first three-way valve 222. A third three-way valve 226 couples third passage 220 to atmosphere. Thus, third passage 220 is configured to direct exhaust gas from the outlet of the turbine 204 to either atmosphere or to second passage 218. Additionally, as explained below, under some conditions at least a portion of the exhaust gas from third passage 220 may be routed back to the intake of the engine via an exhaust gas recirculation (EGR) system.

Further, in the disclosed embodiments, an exhaust gas recirculation (EGR) system may route a desired portion of exhaust gas from third passage 220 to intake manifold 44. FIG. 2 shows an EGR system with the EGR passage 228 coupled to the third passage 220 downstream of the outlet of the turbine 204 and upstream of third three-way valve 226. The EGR passage 228 may bifurcate to a low-pressure EGR (LP-EGR) passage 252 and a high-pressure EGR (HP-EGR) passage 250.

During engine peak power conditions, exhaust back pressure downstream of the turbocharger (due to the contribution from emissions components) may be high (for example, more than 1.5 bar), yet still lower than intake manifold pressure (which may be around 2 bar, for example). In one example, a venturi device 251 may be installed along the intake passage 42 downstream of the compressor 206 and upstream of the CAC 232 to enable flow of EGR from downstream of the turbine. Intake air from the compressor outlet to the CAC inlet acts as motive flow for the venturi device 251. The HP-EGR passage 250 is coupled to a suction flow inlet of the venturi device 251. In another example, the third three-way valve 226 may act as a throttle, increasing the backpressure to enable flow of EGR.

The LP-EGR passage 252 flows EGR to the intake passage 42 upstream of the compressor 206, while the HP-EGR passage 250 flows HP-EGR to the intake passage 42 downstream of the compressor 206. An EGR valve 230 may be present at the bifurcation of the EGR passage 228 into the LP-EGR passage 252 and the HP-EGR passage 250. EGR valve 230 may be actuated by a suitable actuator, such as a pneumatically, hydraulically, or electrically controlled actuator. The position of the EGR valve may be regulated via the actuator by a controller to achieve the desired EGR flow through the LP-EGR passage or the HP-EGR passage, depending on operating conditions, as will be described below with reference to FIGS. 2-5.

The EGR valve 230 may be a three-way valve. In a first position, the EGR valve 230 may direct EGR flow from the EGR passage 228 to the HP-EGR passage 250 and in a second position may direct EGR flow from the EGR passage 228 to the LP-EGR passage 252. In some examples, only the LP-EGR system may be present while in other examples only the HP-EGR system may be present. The EGR system may include an LP-EGR cooler (not shown) along the LP-EGR passage and an HP-EGR cooler (not shown) along the HP-EGR passage to reject heat from the EGR gases to engine coolant, for example. In some examples, no EGR cooler may be present along the HP-EGR passage or the LP-EGR passage.

Under some conditions, the EGR system may be used to regulate the temperature of the air and fuel mixture within combustion chamber 30. Thus, it may be desirable to measure or estimate the EGR mass flow. EGR sensors may be arranged within the EGR passage or intake passage and may provide an indication of one or more of EGR mass flow, pressure, temperature, and concentration of $O_2$. In some embodiments, one or more sensors may be positioned within LP-EGR passage 252, HP-EGR passage 250, or intake passage 42 to provide an indication of one or more of a flow rate, pressure, temperature, and concentration of $O_2$ or another species to determine EGR flow rate and concentration relative to airflow rate. Exhaust gas diverted through LP-EGR passage 252 may be diluted with fresh intake air at a mixing point located at the junction of LP-EGR passage 252 and intake passage 42.

As shown in FIG. 2, the exhaust system 70 is operating in a first standard mode 200 where each of the first three-way valve 222, second three-way valve 224, and third three-way valve 226 are in respective first positions. The exhaust system may be operated in the first standard mode of operation when there is an increase torque demand, for example, when vehicle acceleration is desired. In the first position, first three-way valve 222 blocks the fluidic coupling of the second passage 218 to the first passage 216, and thus exhaust travels directly from the exhaust manifold to the inlet of the turbine via first passage 216. In the first position, the second three-way valve 224 fluidically couples second passage 218 to atmosphere. In the first position, the third three-way valve 226 blocks the fluidic coupling of third passage 220 to atmosphere. Thus, in the first standard mode of operation, exhaust travels along a first flow path that includes the exhaust flowing from the exhaust manifold directly to the turbine via the first passage, from the turbine to the second passage via the third passage, and from the second passage, through the plurality of aftertreatment devices, and to atmosphere via the second passage.

In an example, when each of the first, second, and third three-way valves are in the respective first positions, the first three-way valve is configured to direct exhaust only to the turbine, the second three-way valve is configured to direct exhaust only to atmosphere, and the third three-way valve is configured to direct exhaust only to the at least one aftertreatment device (via the third passage and second passage).

During the first standard mode, exhaust from downstream of the turbine and upstream of the third three-way valve 226 is directed through the EGR passage 228. The EGR valve 230 in the first position directs the flow of exhaust towards the HP-EGR passage 250, delivering exhaust to the intake 42 downstream of the compressor 206. In one example, the exhaust delivered through HP-EGR passage 250 may be high pressure exhaust due to the backpressure generated in the third passage 220, upstream of the third three-way valve 226 and downstream of the turbine 204, and in the second passage 218, through the plurality of aftertreatment devices. The high pressure from the second and third passages may be directed through the EGR passage 228 to the HP-EGR passage 250 through the EGR valve 230 in the first position. In one example, if the venturi device is present in the intake passage 42 between the compressor 206 and the CAC 232, as described above, the HP-EGR may be directed to the suction flow inlet of the venturi device where lower static pressure is created.

The HP-EGR directed to the intake passage downstream of the compressor may decrease the transient lag time while the compressor is still gathering rotational momentum to compress the air supply through the intake to the engine to meet the increased torque demand. The HP-EGR introduced downstream of the compressor may provide the required pressure to the intake air being delivered to the engine during this period.

FIG. 3 schematically shows exhaust system 70 operating in a second standard mode of operation 300. The exhaust system may be operated in the second standard mode of operation 300 during engine peak load conditions, wherein the first valve in a third position may function as a wastegate valve, directing portion of the exhaust away from the turbine, towards the at least one aftertreatment device, to reduce load on the turbine. During the second standard mode, the second three-way valve 224 and the third three way valve 226 are each in a respective first position and the first three-way valve 222 is in the third position. The first three-way valve 222 in the third position may receive exhaust flow from the exhaust manifold through the first passage 216 and may direct a first portion of the exhaust to flow to the turbine and a second portion of the exhaust to flow away from the turbine, towards at least one aftertreatment device. The portion of the exhaust directed by the first-three way valve to the turbine flows through the turbine, through the third passage 220 towards the third three-way valve 226 in the first position. The third three-way valve 226 in the first position directs the exhaust to flow through the third passage to join the second passage 218 and flow to the at least one aftertreatment device downstream of the first three-way valve 222. The exhaust flowing through the aftertreatment device through the second passage 218 is directed to atmosphere through the second valve in the first position. During the second standard mode, the EGR continues to be directed to the intake 42 through the HP-EGR passage 250, similar to the first mode of operation.

In an example, when the first three-way valve is in the third position, and each of the second, and the third three-way valves are in the respective first positions, the first three-way valve is configured to direct the first portion of the exhaust to the turbine, and the second portion of the exhaust away from the turbine to at least one aftertreatment device, the second three-way valve is configured to direct exhaust only to atmosphere, and the third three-way valve is configured to direct exhaust only to the at least one aftertreatment device (via the third passage and second passage).

In one example, the first three-way valve may be controlled based on boost pressure. If boost pressure is greater than a threshold pressure, the position of the first three-way valve may be adjusted to the third position to bypass a portion of exhaust gas around the turbine, where the portion of the exhaust gas travels through the first three-way valve to the at least one aftertreatment device, then from the aftertreatment device to atmosphere, to reduce the load on the turbine. In contrast, when boost pressure is below the threshold pressure, all exhaust from the exhaust manifold may pass through the first three-way valve to (and through) the turbine (for example, during the first standard mode).

The first three-way valve may further be controlled based on EGR demand. For example, if during peak power and/or load conditions (where the first three-way valve is typically controlled to the third position to act as a wastegate), EGR demand is relatively high (e.g., higher than can be provided by the portion of exhaust routed to the turbine when the first three-way valve is in the third position), the first three-way valve 222 may be adjusted to the first position to direct all the exhaust toward the turbine via the first passage. By doing so, all exhaust may be available to meet the EGR demand. However, to reduce the load on the turbine and to meet the EGR demand, the wastegate valve 234 may be opened, thus allowing the exhaust to bypass the turbine 204 to prevent turbine over speeding during peak load. The exhaust may flow from the first passage 216 to (and through) the wastegate valve 234 to the third passage 220, downstream of the turbine 204 to provide adequate exhaust for recirculation through the EGR passage 228 to meet EGR demand.

FIG. 4 schematically shows exhaust system 70 operating in a first bypass mode of operation 400 where each the first three-way valve 222, second three-way valve 224, and third three-way valve 226 are in respective second positions. The exhaust system may be operated in the first bypass mode during cold start conditions, where the after treatment devices have not reached light-off temperature and/or when the particulate material in the exhaust may be more than a threshold value. In the second position, first three-way valve 222 fluidically couples the second passage 218 to the first passage 216, and thus exhaust travels from the exhaust manifold to the plurality of aftertreatment devices without first passing through the turbine. In the second position, second three-way valve 224 fluidly couples second passage 218 to the inlet of the turbine. In the second position, third three-way valve 226 fluidically couples third passage 220 to atmosphere. Thus, in the first bypass mode of operation, exhaust travels along a flow path that includes from the exhaust manifold to the second passage via the first passage; through the aftertreatment devices and to the turbine via the second passage; and from the turbine to atmosphere via the third passage.

In one example, when each of the first, second, and third three-way valves are in the respective second positions, the first three-way valve is configured to direct exhaust only to the second passage, the second three-way valve is configured to direct exhaust only to the turbine, and the third three-way valve is configured to direct exhaust only to atmosphere.

The EGR flow to the intake during the first bypass mode is directed from downstream of the turbine and upstream of the third valve in second position, through the EGR valve to the LP-EGR passage, flowing exhaust to the intake upstream of the compressor.

FIG. 5 schematically shows exhaust system 70 operating in a second bypass mode of operation 500 where the first three-way valve 222 and third three-way valve 226 are in respective second positions while the second three-way valve 224 is in the third position. The exhaust system may be operated in the second bypass mode during engine idle conditions to reduce pumping losses by diverting a portion of the exhaust flow from the at least one aftertreatment device to atmosphere, reducing the exhaust flow to turbine.

In the second position, first three-way valve 222 fluidically couples the second passage 218 to the first passage 216, and thus exhaust travels from the exhaust manifold to the plurality of aftertreatment devices without first passing through the turbine. In the third position, second three-way valve 224 fluidly couples second passage 218 to the inlet of the turbine and to atmosphere, directing part of the exhaust away from the turbine to atmosphere, while the remaining exhaust flows through the second valve in the third position to the turbine. The exhaust flows through the turbine to the third passage 220 to the third three-way valve 226 in the second position, fluidically coupling the third passage 220 to atmosphere, flowing exhaust from the turbine to the atmosphere.

Thus, in the second bypass mode of operation, exhaust travels along a flow path that includes flowing exhaust from the exhaust manifold to the second passage via the first passage; through the aftertreatment devices, and from the aftertreatment devices partly to atmosphere and partly to the turbine via the second passage. After traveling through the turbine, the exhaust travels to atmosphere via the third passage.

In one example, when each of the first and third three-way valves are in the respective second positions and the second three-way valve is in the third position, the first three-way valve is configured to direct exhaust only to the second passage, the second three-way valve is configured to direct a portion of the exhaust to the turbine and a portion of the exhaust to atmosphere, and the third three-way valve is configured to direct exhaust only to atmosphere.

The EGR flow to the intake during the second bypass mode is directed from downstream of the turbine and upstream of the third valve in second position, through the EGR valve to the LP-EGR passage, flowing exhaust to the intake upstream of the compressor.

Thus, the exhaust system 70 may be operated in either a first or a second standard mode of operation that each include flowing exhaust through the turbine before the at least one aftertreatment device, or the exhaust system may be operated in either a first or a second bypass mode of operation in order to route exhaust through the at least one aftertreatment device before the turbine. The mode of operation may be selected based on operating conditions in order to provide a rapid turbocharger response, expedite catalyst warm-up, or other parameter.

Figure 6:
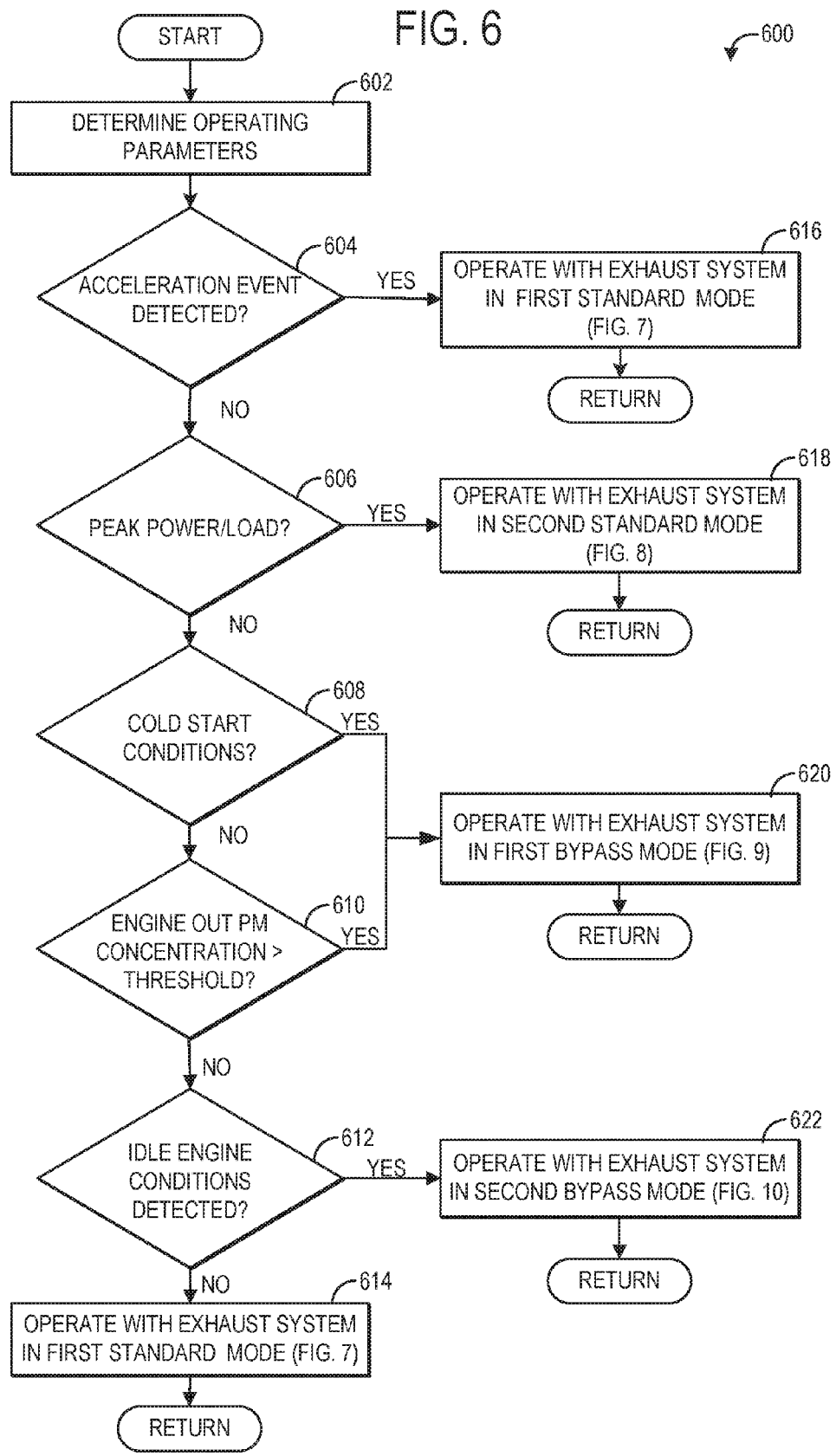
FIG. 6 is a flow chart illustrating a method for determining a mode of operation for an exhaust system.

FIG. 6 is a flow chart illustrating a method 600 for selecting an exhaust system mode of operation. Method 600 may be carried out in order to operate an exhaust system, such as exhaust system 70 of FIGS. 1-5, in a desired mode of operation. Instructions for carrying out method 600 and the rest of the methods included herein may be executed by a controller (e.g., controller 12) based on instructions stored on a memory of the controller and in conjunction with signals received from sensors of the engine system, such as the sensors described above with reference to FIGS. 1-5. The controller may employ engine actuators of the engine system, such as the three-way valves, wastegate, throttle, etc., to adjust engine operation, according to the methods described below.

At 602, method 600 includes determining operating parameters. The determined operating parameters may include, but are not limited to, engine speed, requested torque, engine temperature, boost pressure, engine output, exhaust gas constituent concentration, and other parameters. At 604, based on the determined operating parameters, method 600 determines if a vehicle or engine acceleration event is detected. The vehicle or engine acceleration event may be detected based on an increase in engine or vehicle speed, change in accelerator pedal position, or other parameter. During an acceleration event, an increase in engine torque is requested, and thus as much exhaust energy as possible may be directed to the turbine to provide desired boost pressure to meet the torque request. Accordingly, if the acceleration event is detected, method 600 proceeds to 616 to operate with the exhaust system in the first standard mode in order to directly flow exhaust to the turbine and then to at least one aftertreatment device. Operation in the first standard mode will be described in more detail below with respect to FIG. 7. Method 600 then returns.

If an acceleration event is not detected, method 600 proceeds to 606 to determine if the engine is operating under peak power and/or load conditions. Peak power and/or load conditions may include maximum engine load and/or power output (e.g., operation within a threshold range of maximum rated engine power output, such as within 90% of the maximum rated engine power output), and may be detected based on mass airflow, exhaust temperature, intake throttle position, or other suitable parameter. When the engine is operating under peak power and/or load conditions, exhaust temperature may reach relatively high temperatures that may lead to turbine damage, and thus it may be desirable to flow part of the exhaust away from the turbine, through the aftertreatment devices, in order to reduce the temperature and/or pressure of the exhaust that reaches the turbine. Such an operation may enhance engine efficiency, for example. Thus, if it is determined that the engine is operating under peak power and/or load conditions, method 600 proceeds to 618 to operate in a second standard mode. The second standard mode will be discussed further with reference to FIG. 8. Method 600 then returns.

If peak load conditions are not detected, the method proceeds to 608 to assess if cold start conditions are present. Cold start conditions may include engine temperature below a threshold temperature, catalyst temperature below a threshold temperature, engine temperature being equal to ambient temperature at start-up, less than a threshold amount of time having elapsed since an engine start, or other suitable parameters. In engine cold start conditions, engine temperature may be below standard operating temperature (e.g., 100° F.) and thus one or more aftertreatment devices in the exhaust, such as a TWC, may be below light-off temperature. To expedite aftertreatment device warm-up, exhaust may be routed through the one or more aftertreatment devices before being routed through a turbine, and thus if the engine is operating under cold start conditions, method 600 proceeds to 620 to operate with the exhaust system in a first bypass mode, which will be explained in more detail below with respect to FIG. 9.

If the engine is not operating under cold start conditions, for example if engine temperature is above a threshold temperature, method 600 proceeds to 610 to determine if the engine out particulate matter concentration is greater than a threshold concentration. Engine out particulate matter concentration may be estimated based on operating conditions, or it may be measured by a particulate matter sensor located in the exhaust. If the particulate matter concentration is greater than the threshold, the turbine may experience degradation when the particulate matter impinges on the turbine blades, and thus it may be desirable to first route the exhaust through a particulate filter. The threshold particulate matter concentration may be based on a tolerance of the turbine to withstand particulate matter, for example.

Accordingly, if the engine out particulate matter concentration is greater than the threshold, method 600 proceeds to 620 to operate in the first bypass mode, as will be discussed with reference to FIG. 9. Method 600 then returns.

If the engine out particulate matter concentration is not greater than the threshold, method 600 proceeds to 612 to detect if engine idle conditions are present, such as by detecting that engine speed is below a threshold (e.g., less than 500 RPM), detecting that throttle position is less than a threshold, and/or by detecting that the vehicle is in a stationary position with the engine running. If engine idle conditions are detected, the method 600 proceeds to 622 to operate the exhaust system in a second bypass mode. During the second bypass mode, the flow of exhaust through the turbine may be reduced by directing part of the exhaust to atmosphere to reduce pumping losses, as will be discussed with reference to FIG. 10. If idle engine conditions are not met, the method proceeds to 614 and operates the exhaust system in the first operating mode. The method 600 then returns.

Thus, method 600 includes operating with the exhaust system in the first standard mode of operation, where exhaust first travels through the turbine before traveling through one or more aftertreatment devices, during most engine operating conditions, including torque demand during acceleration. However, the exhaust system may be operated in the second standard mode of operation, where a part of the exhaust is directed away from the turbine, towards at least one aftertreatment device, to reduce the load on the turbine during engine peak power and/or load conditions. The exhaust system may also be operated in the second standard mode of operation when boost pressure in the intake system of the engine exceeds a requested boost pressure, even if the engine is not at peak power or load. The exhaust system may operate in a first bypass mode where exhaust first travels through the at least one aftertreatment device before traveling through the turbine, in response to certain operating conditions. These may include during cold start conditions and when engine out particulate matter concentration is greater than a threshold. In another example, the engine may be operated in the first bypass mode when regeneration of one of the aftertreatment devices, such as a particulate filter, is indicated, in order to prevent heat loss through the turbine that may delay or prolong the regeneration.

The exhaust system may be operated in the second bypass mode, where flow of exhaust from at least one aftertreatment device to the turbine is partly directed to atmosphere, for example, to reduce pumping losses during engine idle conditions. Further, the first standard mode of operation may be prioritized during an acceleration event, particularly when boost pressure is relatively low or when exhaust temperature is low, in order to ensure that requested torque be rapidly delivered. This prioritization may include operating in the standard mode responsive to an acceleration event, even when the engine is operating under cold start conditions, particulate matter concentration is above the threshold, etc. However, if exhaust temperature is relatively high, the exhaust system may be operated in the first bypass mode, even during an acceleration event, to prevent high temperature exhaust from degrading the turbine.

Figure 7:
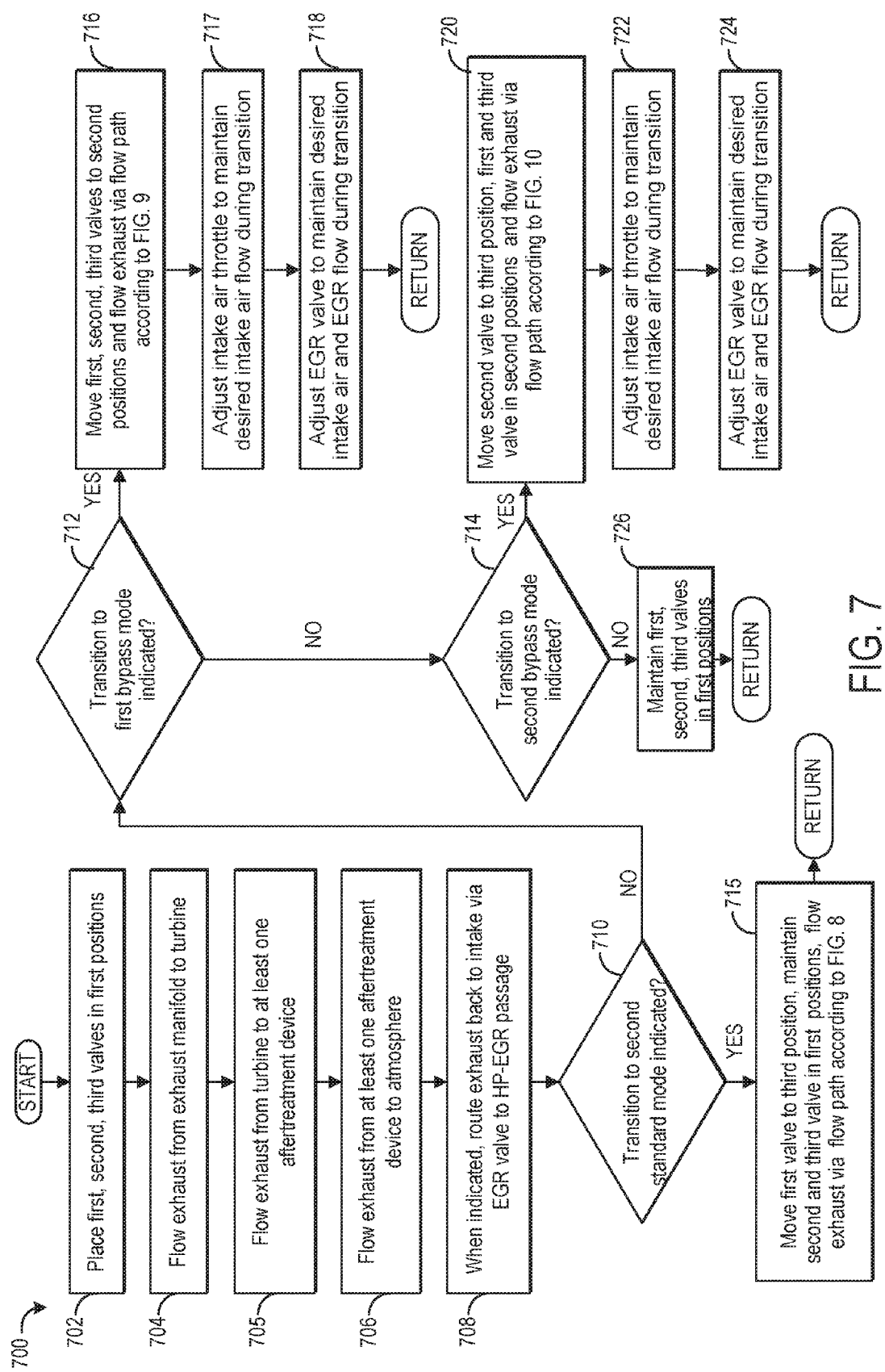
FIG. 7 is a flow chart illustrating a method for operating an exhaust system in a first standard mode.

FIG. 7 is a flow chart illustrating a method 700 for operating with an exhaust system, such as exhaust system 70 of FIGS. 1-5, in a first standard mode of operation. Method 700 may be executed as part of method 600, for example in response to a detected acceleration event. At 702, method 700 includes placing each of a first, second, and third three-way valves in respective first positions. As explained above with respect to FIG. 2, when all of the first three-way valve 222, the second three-way valve 224, and the third three-way valve 226 are placed in the first positions, exhaust travels through the exhaust system along a first flow path. The first flow path includes flowing exhaust from an exhaust manifold to a turbine, as indicated at 704. The first flow path further includes flowing exhaust from the turbine to (and through) at least one exhaust aftertreatment device, as indicated at 705. The first flow path further includes flowing exhaust from the at least one aftertreatment device to atmosphere, as indicated at 706.

When indicated, method 700 also includes, at 708, routing at least a portion of exhaust back to an intake of the engine via an HP-EGR passage, for example, the HP-EGR passage 250 illustrated in FIG. 2. The exhaust flow through the HP-EGR passage may be regulated by controlling flow through the EGR valve 230. The HP-EGR may be delivered to an intake to decrease turbo lag, while a compressor is still spinning to the required RPM to meet the demand for increased torque. The third valve in the first position may generate backpressure, which may enable high pressure to be imparted to the EGR flowing through the HP-EGR passage to the intake downstream of the compressor. The amount of exhaust routed to the intake via the HP-EGR passage may be based on engine speed and load, combustion stability, and/or other conditions, in order to maintain a desired intake oxygen concentration, combustion temperature, engine out NOx concentration, etc.

At 710, method 700 includes determining if a transition to a second standard mode of operation is indicated. This may include the engine reaching a peak power and/or load condition, for example, sustained acceleration for given period of time, exhaust temperature increasing above a threshold, etc. If a transition to the second standard mode is indicated, the method 700 proceeds to 715 to position the first valve in the third position, maintain each of the second and third valves in the respective first positions, and flow exhaust via a flow path described below in reference to FIG. 8. If transition to the second standard mode is not indicated, the method 700 proceeds to 712 to assess if a transition to first bypass mode is indicated.

Figure 9:
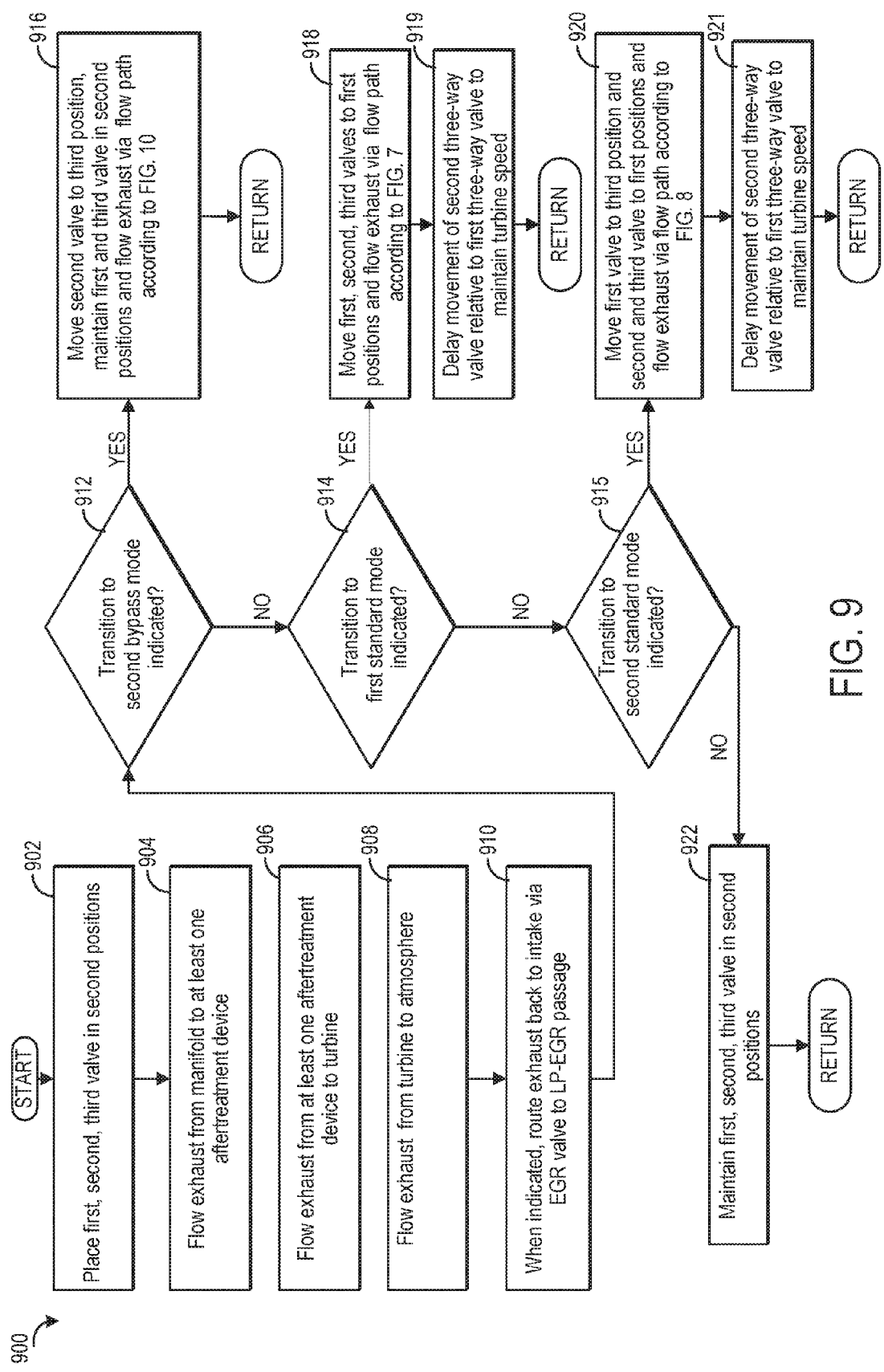
FIG. 9 is a flow chart illustrating a method for operating an exhaust system in a first bypass mode.

If transition to the first bypass mode is indicated, for example, if the engine is still operating under cold start conditions after the conditions for operating under the first standard mode have passed (e.g., once the engine is no longer accelerating) or when PM load exceeds a threshold, the method 700 proceeds to 716 to position each of the first, second and third three-way valves in respective second positions and to flow exhaust via the flow path illustrated in FIG. 9.

During the transition from the first standard mode to the first bypass mode, a transient drop in boost pressure may occur due to a delay in exhaust reaching the turbine as the exhaust system switches from flowing exhaust directly from the exhaust manifold to the turbine and instead starts to flow exhaust through the aftertreatment device(s) first. As the exhaust initially flows through the aftertreatment devices, there may be a short time interval where exhaust is not rotating the turbine. Further, the exhaust reaching the turbine may be cooler or at a different pressure than when operating under the first standard mode. Collectively, this may result in a drop of boost pressure during the transition.

Accordingly, method 700 includes one or more actions that may be taken to mitigate this drop in boost pressure. This may include, at 717, adjusting an intake air throttle to maintain desired intake airflow during the transition. Additionally or alternatively, method 700 includes adjusting the EGR valve at 718 to maintain desired intake air and HP- EGR flow during the transition. For example, the EGR valve may be opened by a larger degree to flow more EGR during the transition to compensate for a transient drop exhaust pressure downstream of the turbine. The extent to which the intake throttle and/or the EGR valve are adjusted may be based on initial turbine speed and/or exhaust temperature.

If transition to the first bypass mode is not indicated, the method 700 proceeds to 714 to assess if a transition to a second bypass mode is indicated, for example, if the engine begins to operate in an engine idle condition. If yes, at 720 the method 700 transitions to the second bypass mode to position the second valve to the third position, position the first and the third valves in respective second positions, and flow exhaust via the flow path illustrated in FIG. 10.

At 722, method 700 may include adjusting an intake air throttle to maintain desired intake airflow during the transition from the first standard mode to the second bypass mode. Additionally or alternatively, method 700 includes adjusting the EGR valve at 724 to maintain desired intake air and HP-EGR flow during the transition. For example, the EGR valve may be opened by a larger degree to flow more EGR during the transition to compensate for a transient drop exhaust pressure downstream of the turbine. The extent to which the intake throttle and/or the EGR valve are adjusted may be based on initial turbine speed and/or exhaust temperature. Method 700 then returns.

At 714, if the transition to the second bypass mode is not indicated, the method 700 proceeds to 726, where the exhaust system is maintained in the first standard mode with the first, second, and third three-way valves in the first positions to continue to flow exhaust along the first flow path. Method 700 then returns.

Figure 8:
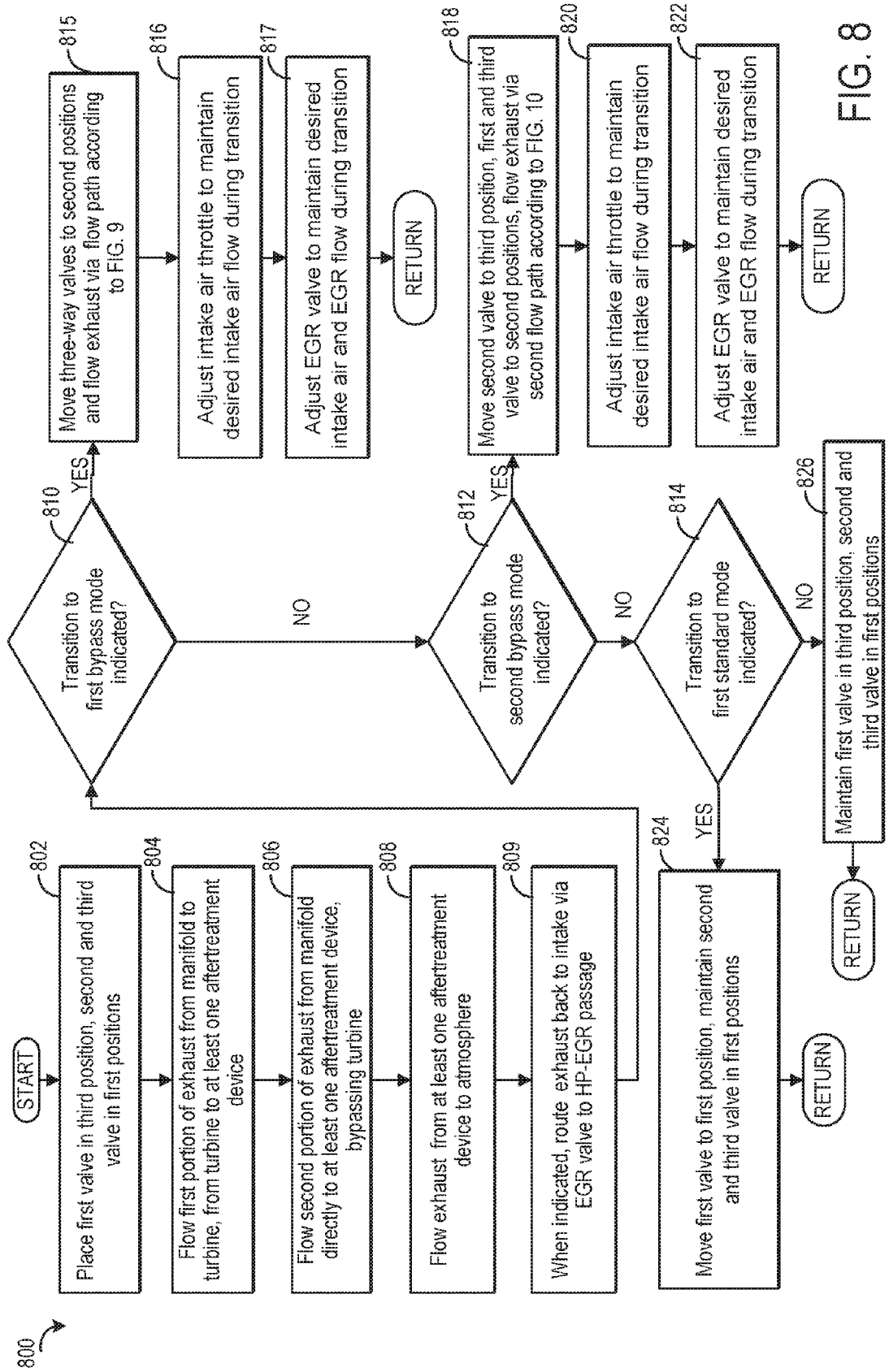
FIG. 8 is a flow chart illustrating a method for operating an exhaust system in a second standard mode.

FIG. 8 is a flow chart illustrating a method 800 for operating an exhaust system, such as the exhaust system 70 of FIGS. 1-5, in a second standard mode of operation. Method 800 may be executed as part of methods 600 and 700, for example, in response to engine peak power and/or load conditions. The exhaust system may also be operated in the second standard mode of operation when boost pressure in the intake system of the engine exceeds a requested boost pressure, even if the engine is not at peak power or load. At 802, method 800 includes positioning a first three-way valve in a third position and positioning a second three-way valve and a third three-way valve in respective first positions to flow exhaust along a second flow path. As explained above with respect to FIG. 3, the second flow path includes, at 804, flowing a first portion of exhaust along a first passage through the first valve in the third position to a turbine, and from turbine through the third valve in the first position to the at least one aftertreatment device. At 806, a second portion of exhaust is directed through the first valve in the third position to the at least one aftertreatment device, bypassing the turbine. At 808, exhaust flows from the at least one aftertreatment device to atmosphere through the second valve in the first position.

When indicated, method 800 also includes, at 809, routing at least a portion of exhaust back to an intake of the engine via an HP-EGR passage. The exhaust flow through the HP-EGR passage may be regulated by controlling flow through the EGR valve 230 in the first position, as illustrated in FIG. 3. Similar to the method 700, in method 800, the HP-EGR may be delivered to the intake and the third valve in the first position may generate a backpressure, which may enable high pressure to be imparted to the EGR flowing to the intake. The amount of exhaust routed to the intake via the HP-EGR passage may be based on engine speed and load, combustion stability, and/or other conditions, in order to maintain a desired intake oxygen concentration, combustion temperature, engine out NOx concentration, etc.

At 810, method 800 includes determining if a transition to a first bypass mode of operation is indicated. This may include the engine exiting out of peak power/load conditions while the engine is still operating under cold start conditions, particulate matter in exhaust rising above a threshold etc. If transition to the first bypass mode is indicated, the method 800 proceeds to 815 to position the first, second, and third three-way valves in respective second positions and flow exhaust via the flow path described below with reference to FIG. 9.

Similar to the transition from the first standard mode to the first bypass mode, during the transition from the second standard mode to the first bypass mode, a transient drop in boost pressure may occur due to a delay in exhaust reaching the turbine as the exhaust system switches from flowing all exhaust directly from the exhaust manifold to the turbine to instead flowing exhaust through the aftertreatment device(s) first. As the exhaust initially flows through the aftertreatment devices, bypassing the turbine, there may be a short time interval where exhaust is not rotating the turbine. Further, the exhaust reaching the turbine may be cooler or at a different pressure than when operating under the second standard mode. Collectively, this may result in a drop of boost pressure during the transition.

Accordingly, method 800 includes one or more actions that may be taken to mitigate this drop in boost pressure. This may include, at 816, adjusting an intake air throttle to maintain desired intake airflow during the transition. Additionally or alternatively, method 800 includes adjusting the EGR valve at 817 to maintain desired intake air and HP-EGR flow during the transition. The extent to which the intake throttle and/or the EGR valve are adjusted may be based on initial turbine speed and/or exhaust temperature.

If the transition to the first bypass mode is not indicated, the method 800 proceeds to 812 to assess if a transition to a second bypass mode is indicated. If the transition to the second bypass mode is indicated, for example, if the engine begins to operate under engine idle/low load conditions, the method 800 proceeds to 818 to position each of the first and third three-way valves in respective second positions, position the second valve in the third position, and flow exhaust via the flow path illustrated in FIG. 10 and described in more detail below. At 820, the intake air throttle is adjusted to maintain desired intake airflow during the transition. Additionally or alternatively, method 800 includes adjusting the EGR valve at 822 to maintain desired intake air and EGR flow during the transition. The extent to which the intake throttle and/or the EGR valve are adjusted may be based on initial turbine speed and/or exhaust temperature.

If the transition to the second bypass mode is not indicated, the method 800 proceeds to 814 to assess if a transition to a first standard mode is indicated, for example, if an increase in torque demand for engine acceleration is detected. If yes, at 824 the method 800 transitions to the first standard mode by positioning the first valve in the first position and maintaining the second and third valves in respective first positions, to flow through the flow path illustrated in FIG. 7.

At 814, if the transition to the first standard mode is not indicated, for example, when the engine continues to operate at peak power/load, the method 800 proceeds to 826, where the exhaust system is maintained in the second standard mode with the first valve in the third position and the second and third valves in first positions, as described above. Method 800 then returns.

FIG. 9 is a flow chart illustrating a method 900 for operating with an exhaust system, such as the exhaust system 70 of FIGS. 1-5, in the first bypass mode of operation. Method 900 may be executed as part of methods 600, 700, or 800, for example in response to cold start conditions. At 902, method 900 includes placing each of a first, second, and third three-way valve in respective second positions. As explained above with reference to FIG. 4, when all of the first, second, and third three-way valves are placed in the respective second positions, exhaust travels through the exhaust system along a third flow path that includes flowing exhaust from an exhaust manifold to (and through) at least one aftertreatment device, as indicated at 904. The flow path further includes flowing exhaust from the at least one exhaust aftertreatment device to a turbine, as indicated at 906, and at 908, flowing exhaust from the turbine to atmosphere.

When indicated, method 900 also includes, at 910, routing at least a portion of exhaust back to an intake of the engine, upstream of a compressor via an LP-EGR passage. The amount of exhaust routed to the intake via the LP-EGR passage may be based on engine speed and load, combustion stability, and/or other conditions, in order to maintain a desired intake oxygen concentration, combustion temperature, engine out NOx concentration, etc.

At 912, method 900 includes determining if a transition to a second bypass mode of operation is indicated. This may include the engine beginning to operate under engine idle conditions, engine load dropping below threshold, or other suitable parameter. If it is determined at 912 that a transition to the second bypass mode is indicated, method 900 proceeds to 916 to position the second valve in the third position and maintain the first and third three-way valves in the respective second positions and flow exhaust along the flow path illustrated in FIG. 10, and described below.

If a transition to the second bypass mode is not indicated, method 900 proceeds to 914 to determine if a transition to a first standard mode is indicated. If yes, the method 900 proceeds to 918 to move the first, second, and third three-way valves to respective first positions, thus flowing exhaust along the first flow path, discussed above with reference to FIG. 7.

During the transition from the first bypass to the first standard mode, the timing of the movement of the first and second three-way valves may be controlled to ensure exhaust is not routed to atmosphere via the second three-way valve before exhaust from the first passage reaches the turbine. Thus, method 900 may include, at 919, delaying movement of the second three-way valve to the first position relative to the movement of the first three-way valve to the first position. For example, the controller may send a signal to move the first three-way valve from the second position to the first position responsive to the indication to transition to the first standard mode. The controller may delay sending the signal to move the second three-way valve from the second position to the first position by a given amount of time. The delay time may be based on the length of the first passage, exhaust mass flow through the first passage, etc., such that the exhaust in the second passage begins to be routed to atmosphere at the same time or just prior to when exhaust in the first passage reaches the turbine. Method 900 then returns.

If the transition to the first standard mode is not indicated, method 900 determines if a transition to a second standard mode is indicated at 915. The transition from the first bypass mode to the second standard mode may be detected when a tip-in event is detected while operating during cold start conditions, for example. If yes, at 920, the method 900 includes positioning the first valve in the third position and the second and third valves in respective first positions, thus flowing exhaust via the flow path described with reference to FIG. 8. During the transition from the first bypass mode to the second standard mode, method 900 may include, at 921, delaying movement of the second three-way valve to the first position relative to the movement of the first three-way valve to the third position, to ensure that exhaust is not routed to atmosphere via the second three-way valve before exhaust from the first passage reaches the turbine.

If the transition to the second standard mode is not indicated, the method 900 proceeds to 922, where the system is maintained in the first bypass mode with the first, second, and third three-way valves in the second position. The method 900 then returns.

Figure 10:
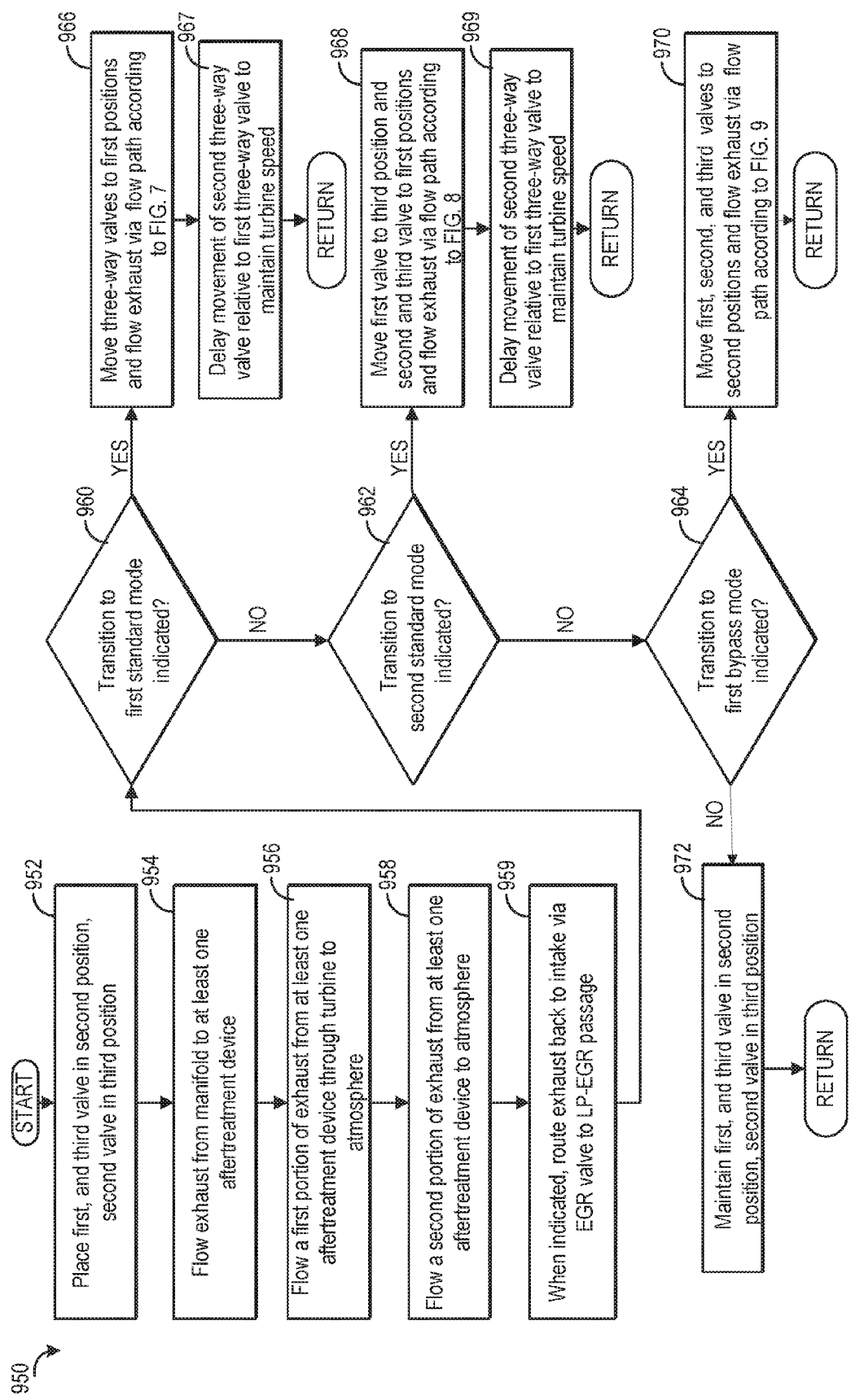
FIG. 10 is a flow chart illustrating a method for operating an exhaust system in a second bypass mode.
Figure 11:
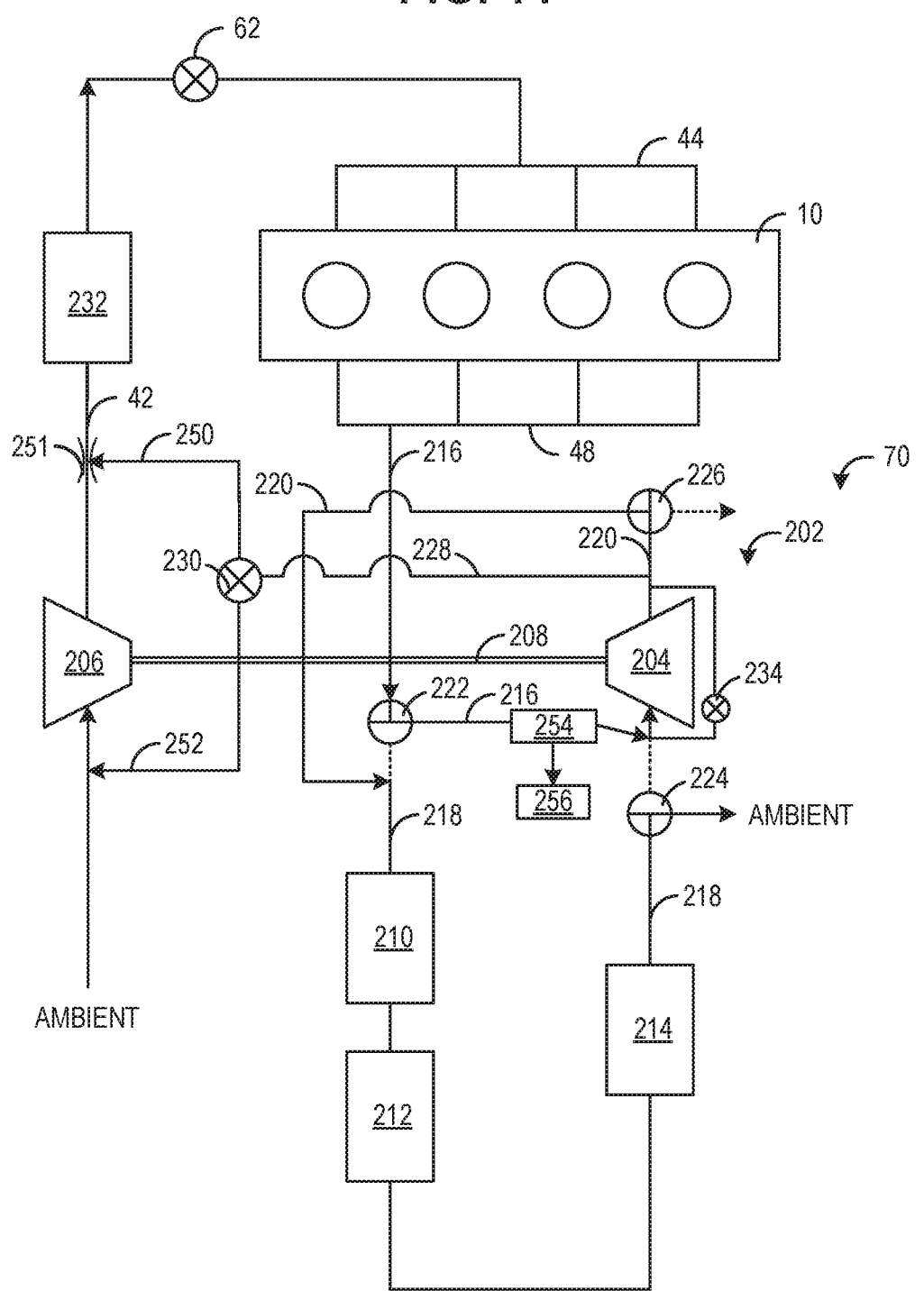
FIG. 11 shows an embodiment of an exhaust system with an exhaust energy recovery system.

FIG. 10 is a flow chart illustrating a method 950 for operating with an exhaust system, such as the exhaust system 70 of FIGS. 1-5, in the second bypass mode of operation. Method 950 may be executed as part of method 600, 700, 800, or 900, for example in response to engine idle conditions or in response to engine particulate matter concentration exceeding a threshold. At 952, method 950 includes placing each of the first and third three-way valves in respective second positions and the second valve in a third position. As explained above with respect to FIG. 5, when each of the first and the third three-way valves are in respective second positions and the second three-way valve is in third position, exhaust travels along a fourth flow path.

The fourth flow path includes, flowing exhaust from an exhaust manifold to (and through) at least one aftertreatment device at 954. At 956, method 950 includes flowing a first portion of exhaust from the at least one aftertreatment device through the second valve in the third position to a turbine, and from turbine through the third valve in the second position to atmosphere. The flow path further includes, at 958, flowing a second portion of the exhaust from the at least one exhaust aftertreatment device through the second valve in the third position to atmosphere.

When indicated, method 950 also includes, at 959, routing at least a portion of exhaust back to an intake of the engine via an LP-EGR passage. The amount of exhaust routed to the intake via the LP-EGR passage may be based on engine speed and load, combustion stability, and/or other conditions, in order to maintain a desired intake oxygen concentration, combustion temperature, engine out NOx concentration, etc.

At 960, method 900 includes determining if a transition to the first standard mode of operation is indicated. The transition from the second bypass mode to the first standard mode may be detected based on an engine acceleration demand, or other suitable parameter. If it is determined at 960 that a transition to the first standard mode is indicated, method 950 proceeds to 966 to move the first, second, and third three-way valves to the respective first positions and flow exhaust along the first flow path described above with reference to FIG. 7.

During the transition from the second bypass to the first standard mode, the timing of the movement of the first and second three-way valves may be controlled to ensure exhaust is not routed to atmosphere via the second three-way valve before exhaust from the first passage reaches the turbine. Thus, method 950 may include, at 967, delaying movement of the second three-way valve to the first position relative to the movement of the first three-way valve to the first position. For example, the controller may send a signal to move the first three-way valve from the second position to the first position responsive to the indication to transition to the first standard mode. The controller may delay sending the signal to move the second three-way valve from the second position to the first position by a given amount of time. The delay time may be based on the length of the first passage, exhaust mass flow through the first passage, etc., such that the exhaust in the second passage begins to be routed to atmosphere at the same time or just prior to when exhaust in the first passage reaches the turbine. Method 950 then returns.

If a transition to the first standard mode is not indicated, method 950 proceeds to 962 to determine if a transition to a second standard mode is indicated. For example, the transition to the second standard mode may be indicated based on the engine reaching peak power output. If yes, the method 950 proceeds to 968 to move the first valve to the third position and move the second and third three-way valves to respective first positions, thus flowing exhaust along the second flow path illustrated in FIG. 8.

During the transition from the second bypass mode to the second standard mode, the timing of the movement of the first and second three-way valves may be controlled to ensure exhaust is not routed to atmosphere via the second three-way valve before exhaust from the first passage reaches the turbine. Thus, method 950 may include, at 969, delaying movement of the second three-way valve to the first position relative to the movement of the first three-way valve from the second position to the third position. For example, the controller may send a signal to move the first three-way valve from the second position to the third position responsive to the indication to transition to the second standard mode. The controller may delay sending the signal to move the second three-way valve from the second position to the first position by a given amount of time. The delay time may be based on the length of the first passage, exhaust mass flow through the first passage, etc., such that the exhaust in the second passage begins to be routed to atmosphere at the same time or just prior to when exhaust in the first passage reaches the turbine. Method 950 then returns.

If the transition to the second standard mode is not indicated, method 950 determines if a transition to a first bypass mode is indicated at 964. The transition from the second bypass mode to the first bypass mode may be indicated if the engine transitions from idle operation to a non-idle condition, such as during a vehicle launch. If yes, at 970, the method 950 positions the first, second, and third valve in respective second positions, thus flowing exhaust via the third flow path described with reference to FIG. 9. If the transition to the first bypass mode is not indicated, the method 950 proceeds to 972, where the system is maintained in the second bypass mode. The method 950 then returns.

FIG. 11 illustrates an embodiment 980 of the exhaust system 70 of FIGS. 2-5. The features of the exhaust system 70 previously described in relation to FIGS. 2-5 are numbered similarly and not reintroduced. The embodiment 980 includes an exhaust energy recovery system 254 positioned in the first passage 216, downstream of the first three-way valve 222 and upstream of the turbine 204 of the exhaust system 70. Exhaust flowing from the exhaust manifold 48 through the first three-way valve 222 in the first position will flow to (and through) the exhaust energy recovery system 254 coupled to the first passage 216. The exhaust energy recovery system 254 may extract thermal energy from hot exhaust flowing through the exhaust energy recovery system 254 and convert the thermal energy to electrical energy. The converted electrical energy may be stored in a battery 256 coupled to the exhaust energy recovery system 254, while the cooled exhaust may flow through the first passage to the turbine 204 and then through the turbine to the third passage 220.

In one example, the exhaust energy recovery system 254 may include at least one thermal to electrical energy conversion element with at least one side thermally coupling to hot exhaust flowing through the first passage 216 and another side of the conversion element thermally coupling to a cooling; fluid, for example, engine coolant. A temperature difference on either side of the conversion element may result in generation of electric voltage, which may be stored in the battery 256. The energy stored in the battery 256 may be used for performing other vehicle operations, for example, as a source of energy for passenger cabin heating, for window defrosting, etc.

In another example, the exhaust gas energy recovery system may be based on the Rankine cycle, which may include a thermodynamic cycle that uses exhaust heat to vaporize a pressurized fluid. The steam/vapor pressure generated by the vaporized fluid may then drive an expander that may be either directly tied to the crankshaft of the engine or linked to an alternator to generate electricity. In one example, the exhaust gas energy recovery system may be a Thermoelectric Generator (TEG, also called a Seebeck generator). A TEG is a solid state device that converts heat based on temperature differences directly into electrical energy. TEGs may function like heat engines, but are less bulky with no moving parts.

Exhaust flowing out of the exhaust energy recovery system 254 is cooler than the exhaust flowing in to the exhaust energy recovery system. The cooled exhaust exiting the energy recovery system, flows through the first passage 216 to the turbine 204, then through the turbine to the third passage 220, which is fluidically coupled to the EGR passage 228, bifurcating to the LP-EGR passage 252 and the HP-EGR passage 250. The cooled exhaust flows through the EGR passage 228 and to the LP-EGR passage or the HP-EGR passage, depending on engine operating parameters. Consequently, no EGR coolers may be required in the LP-EGR passage or the HP-EGR passage to cool exhaust flowing to the intake 42, thus preventing heat rejection to EGR coolers, and improving overall fuel efficiency. In other examples, one or more EGR coolers may be present in the LP-EGR passage 252 and/or the HP-EGR passage 250, allowing for relatively high amounts of EGR to be directed to engine, even during high exhaust temperature conditions.

The flow of exhaust to the exhaust energy recovery system 254 may be regulated by the position of the first three-way valve 222, upstream of the exhaust energy recovery system. The first three-way valve 222 when in the first position (for example, in the first standard mode during increased torque demand, as illustrated in FIG. 2) may flow exhaust through the first passage 216 to (and through) the exhaust recovery system 254. The cooled exhaust exiting the energy recovery system 254 may flow through the first passage 216 to the turbine 204, and through the turbine to the at least one aftertreatment device, from the at least one aftertreatment device to atmosphere.

The first three-way valve 222 in the second position may direct exhaust to bypass the exhaust recovery system 254 and bypass the turbine and flow exhaust through the second passage 218, directly to the at least one aftertreatment device (for example, in the first bypass mode during cold start conditions and in the second bypass mode during idle engine, as illustrated in FIGS. 4 and 5).

The first valve in the third position may direct a portion of exhaust to the first passage 216, the exhaust flowing to (and through) the exhaust recovery system 254 to the turbine 204, and may direct another portion of the exhaust to flow to the at least one aftertreatment device, bypassing the turbine (for example, in the second standard mode, during peak load conditions, illustrated in FIG. 3). Similar to the exhaust system and methods described above with reference to FIGS. 2-10, the exhaust system illustrated in FIG. 11 may be operated in the four operating modes (first standard, second standard, first bypass, second bypass) and may transition between the four operating modes, depending on engine operating conditions.

FIG. 12 schematically illustrates an engine system 1000 with an exhaust system 71. The exhaust system 71 may be coupled to the engine 10 including a plurality of cylinders, herein depicted as four cylinders arranged in-line, although other configurations are possible. As previously illustrated in FIG. 2, the engine 10 receives intake air via intake manifold 44 and exhausts exhaust gas via exhaust manifold 48. Exhaust system 71 includes a turbocharger 1002 including a compressor 1006 arranged in intake passage 42, and a turbine 1004 arranged along a passage to receive exhaust from the exhaust manifold 48. The compressor 1006 may be at least partially powered by exhaust turbine 1004 via a shaft 1008. Some or all of the exhaust gas may bypass the turbine 1004 via a turbine bypass passage controlled by a wastegate 1030. An exhaust energy recovery system 1020 coupled to a battery 1021 may be fluidically coupled to exhaust passage downstream of the exhaust manifold, and upstream of the turbine 1004.

The exhaust energy recovery system 1020 may include at least one thermal to electrical conversion element, converting the temperature difference between the exhaust gas and a cooling fluid (e.g., engine coolant), to electrical voltage that may be stored in the battery 1021. An HP-EGR passage 1016 with an HP-EGR valve 1017 may flow the cooled exhaust exiting the exhaust energy recovery system 1020 upstream of the turbine to the intake passage downstream of the compressor. An LP-EGR passage 1018 may flow cooled exhaust, exiting the exhaust energy recovery system 1020, from downstream of the turbine 1004 to the intake passage upstream of the compressor 1006.

Exhaust system 71 includes one or more exhaust aftertreatment devices, similar to the aftertreatment devices described with reference to FIG. 2. As illustrated in FIG. 12, exhaust system 71 includes a first aftertreatment device 1010, a second aftertreatment device 1012, and a third aftertreatment device 1014. The aftertreatment devices may include one or more of a three-way catalyst (TWC), hydrocarbon trap, particulate filter, muffler, oxidation catalyst, lean NOx trap (LNT), selective catalytic reduction (SCR) system, or other suitable aftertreatment device. In one specific example, engine 10 may be a gasoline engine and first aftertreatment device may be a TWC, second aftertreatment device may be an underbody converter, and third aftertreatment device may be a muffler. In another specific example, engine 10 may be a diesel engine and first aftertreatment device may be a diesel oxidation catalyst, second aftertreatment device may be a diesel particulate filter, and third aftertreatment device may be an SCR/LNT. The examples provided above are non-limiting, and other configurations are possible.

Exhaust system 71 further includes a plurality of exhaust passages and three-way valves to direct flow of exhaust through the turbine 1004 and through the plurality of aftertreatment devices. Exhaust manifold 48 is fluidically coupled to a first passage 1024. The first passage 1024 is fluidically coupled through a first three-way valve 1022 to the exhaust energy recovery system 1020, and then to the turbine 1004. A second passage 1026 connects the turbine 1004 to the at least one aftertreatment device, and then the aftertreatment device to atmosphere. A third passage 1028 has an inlet coupled to the first passage 1024 through the first three-way valve 1022, and the third passage 1028 has an outlet coupled to the second passage 1026, downstream of the turbine and upstream of the at least one aftertreatment device. Thus, when the first three-way valve 1022 is in a first position, the first passage 1024 is configured to direct exhaust gas directly from exhaust manifold 48 through the exhaust energy recovery system 1020 to the turbine 1004, at least under some conditions. When the first three-way valve is in the second position, the third passage 1028 is configured to direct exhaust directly to the at least one aftertreatment device, bypassing exhaust flow around the exhaust energy recovery system 1020 and the turbine 1004, at least in certain operating conditions.

In one example, during engine low load conditions, including idle engine conditions, the exhaust system may be operated in a first operating mode. In the first operating mode, the first three-way valve 1022 in a first position directs exhaust through the first passage 1024 to the exhaust energy recovery system 1020. Exhaust then flows through the exhaust energy recovery system 1020 to the turbine 1004. Thermal energy of exhaust may be extracted and converted to electrical energy by the exhaust energy recovery system 1020, and stored in the battery 1021. The cooled exhaust exiting the exhaust energy recovery system 1020 flows to the turbine 1004 and then through the turbine to the second passage 1026, where the exhaust flows through the at least one aftertreatment device to atmosphere. LP-EGR may be directed from the second passage 1026 to the intake 42 upstream of the compressor 1006 through the LP-EGR passage 1018, by regulation of the LP-EGR valve 1019. The exhaust flowing through the LP-EGR passage 1018 is already at a reduced temperature as thermal energy was extracted from exhaust when flowing through the exhaust energy recovery system 1020. The LP-EGR delivered to the intake upstream of the compressor may reduce emissions and increase fuel efficiency.

When the engine is operating at peak power and/or load conditions, the exhaust system may be in a second operating mode, where exhaust flows through the first three-way valve in the first position to (and through) the exhaust energy recovery system 1020 to the turbine 1004. Exhaust then flows through the turbine to the at least one aftertreatment device, and then to atmosphere. Cooled EGR exiting downstream of the exhaust energy recovery system and upstream of the turbine may be directed through the HP-EGR passage to the intake 42, downstream of the compressor 1006, reducing engine pumping losses, improving fuel economy and reducing emissions.

In another example, the exhaust system may be in a third operating mode during cold start conditions when the aftertreatment devices have not yet reached light-off temperature. In the third operating mode the three-way valve 1022 in a second position may flow exhaust through the third passage 1028 to the second passage 1026, then from the second passage 1026 to the at least one of the aftertreatment devices, and then from the at least one aftertreatment device to atmosphere, bypassing the exhaust energy recovery system 1020 and the turbine 1004. No EGR may flow through the HP-EGR and LP-EGR passages to the intake.

FIG. 13 is a flow chart illustrating a method 1100 for selecting an exhaust system mode of operation. Method 1100 may be carried out in order to operate an exhaust system, such as exhaust system 71 of FIG. 12, in a desired mode of operation. Instructions for carrying out method 1100 and the rest of the methods included herein may be executed by a controller (e.g., controller 12) based on instructions stored on a memory of the controller and in conjunction with signals received from sensors of the engine system, such as the sensors described above with reference to FIGS. 1 and 12. The controller may employ engine actuators of the engine system, such as the three-way valves, wastegate, throttle, etc., to adjust engine operation, according to the methods described below.

At 1102, method 1100 includes determining operating parameters. The determined operating parameters may include, but are not limited to, engine speed, requested torque, engine temperature, boost pressure, engine output, exhaust gas constituent concentration, and other parameters. At 1104, based on the determined operating parameters, method 1100 includes determining if an engine low load condition is detected. The engine low load condition may be detected when the engine is idle, the engine is not operating over a threshold speed, or other parameter. Accordingly, if the engine low load condition is detected, method 1100 proceeds to 1112 to operate with the exhaust system in the first operating mode, including flowing exhaust through a first three-way valve in a first position to an exhaust energy recovery system, through the exhaust energy recovery system to a turbine, through the turbine to at least one aftertreatment device, and through the at least one aftertreatment device to atmosphere. Cooled EGR through an LP-EGR passage is directed to an intake upstream of a compressor. Method 1100 then returns.

If an engine low load condition is not detected, method 1100 proceeds to 1106 to determine if the engine is operating under peak power and/or load conditions. Peak power and/or load conditions may include maximum engine load and/or power output, and may be detected based on mass airflow, exhaust temperature, intake throttle position, or other suitable parameter. If it is determined that the engine is operating under peak power and/or load conditions, method 1100 proceeds to 1114 to operate the exhaust system in a second operating mode. The second operating mode includes the first valve being in the first position, and also includes flowing exhaust through the exhaust energy recovery system to the turbine, through the turbine to the at least one aftertreatment device, and through the at least one aftertreatment device to atmosphere. Cooled EGR through an HP-EGR passage is directed to the intake downstream of the compressor. Method 1100 then returns.

If peak load conditions are not detected, the method proceeds to 1108 to assess if cold start conditions are present. Cold start conditions may include engine temperature below a threshold temperature, catalyst temperature below a threshold temperature, engine temperature being equal to ambient temperature at start-up, less than a threshold amount of time having elapsed since an engine start, or other suitable parameters. During engine cold start conditions, engine temperature may be below standard operating temperature (e.g., 100° F.) and thus one or more aftertreatment devices in the exhaust, such as a TWC, may be below light-off temperature. To expedite aftertreatment device warm-up, exhaust may be routed through the one or more aftertreatment devices bypassing the exhaust energy recovery system and the turbine. Thus, if the engine is operating under cold start conditions, method 1100 proceeds to 1116 to operate with the exhaust system in a third operating mode, including flowing exhaust through the at least one aftertreatment device to atmosphere, bypassing the exhaust energy recovery system and the turbine. The method 1100 then returns.

If the engine is not operating under cold start conditions, for example if engine temperature is above a threshold temperature, method 1100 proceeds to 1110 and operates the exhaust system in the first operating mode, as described above. The method 1100 then returns.

In this way, an exhaust system of an engine system in a vehicle may be operated in different modes, responsive to engine operating conditions. During operation in the first standard mode, exhaust first flows through the turbine before reaching the exhaust aftertreatment devices, allowing for maximum extraction of exhaust energy via the turbocharger. This may be particularly useful during a vehicle launch or other conditions traditionally associated with turbocharger lag, as rapid turbine response (e.g., spin up) is desired to deliver the requested torque. While operating in the second standard mode, during engine peak load conditions, some load may be directed away from the turbine by diverting at least a part of the exhaust flow from the turbine, reducing load and preventing overheating of the turbine. During operation in the first bypass mode, the exhaust flows through the aftertreatment devices before reaching the turbine. This may allow for rapid catalyst warm-up during cold start conditions, and may prevent high temperature exhaust, particulate matter, or other exhaust components that may degrade the turbine from reaching the turbine. Additionally, exhaust backpressure may be reduced in the first bypass mode of operation. During operation in the second bypass mode, exhaust flowing through the at least one aftertreatment device to the turbine may be partly directed to atmosphere through the second valve to reduce pumping losses during idle engine condition. Further, in all modes of operations described above, exhaust still flows through the aftertreatment devices and is fed to the turbine, allowing for emissions compliance and increased engine performance under all operating conditions, without having to adjust the packing of the engine components.

The technical effect of operating an engine system with an exhaust system in either a first or a second standard mode of operation is providing fast response during acceleration events while reducing load on the turbine during engine peak load conditions. Additionally, the technical effect of operating an engine system with an exhaust system either in a first or a second bypass mode of operation is providing expedited catalyst warm-up under cold start conditions while reducing pumping losses during engine idle conditions.

A method for an engine includes during a first condition, flowing a first portion of exhaust gas to a turbine, from the turbine to at least one aftertreatment device, then from the at least one aftertreatment device to atmosphere, and flowing a second portion of exhaust gas to the at least one aftertreatment device, bypassing the turbine, then from the aftertreatment device to atmosphere, and during a second condition, flowing a third portion of exhaust gas to the at least one aftertreatment device, from the at least one aftertreatment device to the turbine, and then from the turbine to atmosphere, and flowing a fourth portion of exhaust gas to the at least one aftertreatment device, and then from the at least one aftertreatment device to atmosphere, bypassing the turbine. In a first example of the method, wherein the first condition comprises engine output above a first threshold output, and the second condition comprises engine output below a second threshold output. A second example of the method optionally includes the first example and further comprising flowing at least a portion of exhaust gas to an intake of an engine via a common exhaust gas recirculation passage bifurcating into a high pressure exhaust gas recirculation passage and a low pressure exhaust recirculation passage, the common exhaust gas recirculation passage receiving exhaust gas at a location between the turbine and the at least one aftertreatment device. A third example of the method optionally includes one or more of the first and second examples, and further includes, during the first condition, flowing exhaust gas through the common exhaust gas recirculation to the high pressure exhaust gas recirculation passage, from the high pressure exhaust gas recirculation passage to the intake downstream of a compressor, and during the second condition, flowing exhaust gas through the common exhaust gas recirculation to the low pressure exhaust gas recirculation passage, from the low pressure exhaust gas recirculation passage to the intake upstream of the compressor. A fourth example of the method optionally includes one or more of the first through third examples, and further includes, wherein flowing exhaust gas during the first condition comprises placing a first three-way valve in a third position and placing a second three-way valve and a third three-way valve in respective first positions. A fifth example of the method optionally includes one or more of the first through fourth examples, and further includes, flowing exhaust gas during the second condition comprises placing the first three-way valve and the third three-way valve in respective second positions and the second three-way valve in a third position. A sixth example of the method optionally includes one or more of the first through fifth examples, and further includes, responsive to a transition from the first condition to the second condition, adjusting one or more of an intake throttle valve and an exhaust gas recirculation valve to maintain desired intake air flow. A seventh example of the method optionally includes one or more of the first through sixth examples, and further includes, wherein the one or more of the intake throttle valve and exhaust gas recirculation valve are further adjusted based on boost pressure. An eighth example of the method optionally includes one or more of the first through seventh examples, and further comprising, during a third condition, flowing exhaust gas through the turbine, from the turbine to the at least one aftertreatment device, then from the at least one aftertreatment device to atmosphere, and during a fourth condition, flowing exhaust gas through the at least one aftertreatment device, from the at least one aftertreatment device to the turbine, then from the turbine to atmosphere. A ninth example of the method optionally includes one or more of the first through eighth examples, and further includes, wherein the third condition comprises an engine acceleration event, and the fourth condition comprises engine temperature below a threshold temperature.

A system for an engine includes, an engine having an exhaust manifold, a turbocharger turbine fluidically coupled to the exhaust manifold via a first passage, a second passage branching off the first passage upstream of the turbine and having an outlet fluidically coupled to the turbine, a first three-way valve at a junction between the first passage and the second passage, at least one aftertreatment device positioned in the second passage, a second three-way valve positioned in the second passage upstream of the turbine and downstream of the at least one aftertreatment device, the second three-way valve coupling the second passage to atmosphere, a third passage fluidically coupled to an outlet of the turbine and to the second passage upstream of the at least one aftertreatment device, a third three-way valve coupling the third passage to atmosphere, a fourth three-way valve coupling a common exhaust gas recirculation (EGR) passage to a low-pressure EGR (LP-EGR) passage and to a high-pressure EGR (HP-EGR) passage, and a controller storing instructions executable to: responsive to a first engine operating condition, adjust a position of one or more of the first three-way valve, the second three-way valve, the third three-way valve, and the fourth three-way valve to fluidically couple the first passage to each of the turbine and the at least one aftertreatment device, fluidically couple the second passage to atmosphere, fluidically couple the third passage to the second passage, and fluidically couples the common EGR passage to the HP-EGR passage and responsive to a second engine operating condition, adjust the position of one or more of the first three-way valve, the second three-way valve, the third three-way valve, and the fourth three-way valve to fluidically couple the second passage to each of the turbine and to atmosphere, fluidically couple the first passage to the second passage, fluidically couple the third passage to atmosphere, and fluidically couple the common EGR passage to the LP-EGR passage. In a first example of the system, wherein the controller has instructions executable to: fluidically couple the first passage to each of the turbine and the at least one aftertreatment device, adjusts the position of first three-way valve to a third position configured to direct a first portion of exhaust gas to the first passage and a second portion of exhaust gas to the at least one aftertreatment device, fluidically couple the second passage to atmosphere, adjusts the position of the second three-way valve to a first position configured to direct exhaust gas only to atmosphere, fluidically couple the third passage to the second passage, adjusts the position of the third three-way valve to a first position configured to direct exhaust gas only to the second passage, and fluidically couple the common EGR passage to the HP-EGR passage, adjusts the position of the fourth three-way valve to a first position configured to direct exhaust gas only to the HP-EGR passage. A second example of the system optionally includes the first example and further includes, wherein the controller has instructions executable to: fluidically couple the second passage to each of the turbine and atmosphere, adjusts the position of the second three-way valve to a third position configured to direct the third portion of exhaust gas to the turbine and the fourth portion of exhaust gas to atmosphere, fluidically couple the first passage to the second passage, adjusts the position of the first three-way valve to a second position configured to direct exhaust gas only to the second passage, fluidically couple the third passage to atmosphere, adjusts the position of the third three-way valve to a second position configured to direct exhaust gas only to atmosphere, and fluidically couple the common EGR passage to the LP-EGR passage, adjusts the position of the fourth three-way valve to a second position configured to direct exhaust gas only to the LP-EGR passage. A third example of the system optionally includes the first and second example and further includes, an exhaust energy recovery system coupled to a battery positioned in the first passage downstream of the first three-way valve and upstream of the turbine. A fourth example of the system optionally includes one or more of the first through third examples, and further includes, wherein the controller has instructions executable to adjust the position of the first three-way way valve to fluidically couple the first passage to the exhaust energy recovery system. A fifth example of the system optionally includes one or more of the first through fourth examples, and further includes, wherein an inlet of the common EGR passage is coupled to the third passage upstream of the third three-way valve and downstream of the turbine. A sixth example of the system optionally includes one or more of the first through fifth examples, and further includes, wherein the controller comprises further instructions executable to, responsive to a third engine operating condition, adjust the position of one or more of the first, second, third, and fourth three-way valves to fluidically couple the first passage only to the turbine, fluidically couple the third passage only to the second passage, fluidically couple the second passage only to atmosphere, and fluidically couple the common EGR passage to the HP-EGR passage. A seventh example of the system optionally includes one or more of the first through sixth examples, and further includes, wherein the controller includes further instructions executable to, responsive to a fourth engine operating condition, adjust the position of one or more of the first, second, third and fourth three-way valves to fluidically couple the first passage only to the second passage, fluidically couple the second passage only to the turbine, fluidically couple the third passage only to atmosphere, and fluidically couple the common EGR passage only to the LP-EGR passage.

Another example method includes, selectively flowing exhaust gas through a first three-way valve in a first position to a turbine, then from the turbine to at least one aftertreatment device, and then from the at least one aftertreatment device to atmosphere, and responsive to boost pressure above a threshold, adjusting a position of the first three-way valve to bypass a portion of exhaust gas around the turbine, the portion of the exhaust gas traveling through the first three-way to the at least one aftertreatment device, then from the aftertreatment device to atmosphere. A first example of the method further includes, wherein adjusting the position of the first three-way valve further comprises adjusting the position of the first three-way valve to flow a second portion of exhaust gas through the first three-way valve to the turbine, then from the turbine to the at least one aftertreatment device, then from the at least one aftertreatment device to atmosphere.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
during a first operating condition of the engine determined, with an engine controller, based on one or more of a mass airflow sensor, an intake throttle position sensor, and an engine position sensor,
flowing a first portion of exhaust gas from the engine to a turbine via a first three-way valve placed in a third position with the engine controller, the first three-way valve located in a first exhaust passage,
flowing the first portion from the turbine to one or more aftertreatment devices located in a second exhaust passage via a third three-way valve placed in a first position with the controller and a third exhaust passage,
then flowing the first portion from the one or more aftertreatment devices to atmosphere via the second exhaust passage and a second three-way valve placed in a first position with the engine controller, the second three-way valve located in the second passage, and
flowing a second portion of exhaust gas from the engine to the one or more aftertreatment devices in the second exhaust passage via the first exhaust passage, the first three-way valve placed in the third position, and the second exhaust passage, bypassing the turbine, then from the one or more aftertreatment devices to atmosphere via the second passage and the second three-way valve placed in the first position; and
during a second operating condition of the engine determined, with the engine controller, based on one or more of the intake throttle position sensor, the mass airflow sensor, and the engine position sensor,
flowing a third portion of exhaust gas from the engine to the one or more aftertreatment devices in the second exhaust passage via the first exhaust passage, the first three-way valve placed in a second position with the controller, and the second passage,
flowing the third portion from the one or more aftertreatment devices to the turbine via the second passage and the second three-way valve placed in a third position with the controller, and then from the turbine to atmosphere via the third three-way valve placed in a second position with the controller, and flowing a fourth portion of exhaust gas from the engine to the one or more aftertreatment devices in the second exhaust passage via the first exhaust passage, the first three-way valve placed in the second position, and the second passage, and then from the one or more aftertreatment devices to atmosphere, bypassing the turbine via the second exhaust passage and the second three-way valve placed in the third position.

2. The method of claim 1, wherein the first operating condition comprises engine load above a first threshold load, and the second operating condition comprises engine load below a second threshold load.

3. The method of claim 1, further comprising, during engine operation in the first condition or the second condition,
flowing at least a portion of exhaust gas to an intake of the engine via a common exhaust gas recirculation passage and an exhaust gas recirculation valve located in the common exhaust gas recirculation passage,
wherein the common exhaust gas recirculation passage bifurcates into a high pressure exhaust gas recirculation passage and a low pressure exhaust as recirculation passage downstream of the exhaust gas recirculation valve in the direction of exhaust flow, and
wherein the common exhaust gas recirculation passage receives exhaust gas at a location downstream of the turbine in the direction of exhaust flow.

4. The method of claim 3, further comprising, during the first operating condition, flowing exhaust gas through the common exhaust gas recirculation passage to the high pressure exhaust gas recirculation passage, and from the high pressure exhaust gas recirculation passage to the intake downstream of a compressor; and during the second operating condition, flowing exhaust gas through the common exhaust gas recirculation passage to the low pressure exhaust gas recirculation passage, and from the low pressure exhaust gas recirculation passage to the intake upstream of the compressor.

5. The method of claim 1, further comprising, responsive to a transition from the first operating condition to the second operating condition, adjusting one or more of an intake throttle valve and an exhaust gas recirculation valve to maintain desired intake air flow.

6. The method of claim 5, wherein the one or more of the intake throttle valve and the exhaust gas recirculation valve are further adjusted based on boost pressure in the intake, the boost pressure determined with the engine controller.

7. The method of claim 1, further comprising, during a third operating condition of the engine, flowing all of exhaust gas from the engine through the turbine via the first exhaust passage and the first three-way valve placed in a first position with the controller, from the turbine to the one or more aftertreatment devices in the second exhaust passage via the third three-way valve placed in a first position with the controller, and the third exhaust passage, then from the one or more aftertreatment devices to atmosphere via the second exhaust passage and the second three-way valve placed in the first position, and during a fourth operating condition of the engine, flowing all of the exhaust gas from the engine through the one or more aftertreatment devices, via the first exhaust passage, the first three-way valve placed in the second position, and the second exhaust passage, from the one or more aftertreatment devices to the turbine via the second exhaust passage and the second three-way valve placed in a second position, then from the turbine to atmosphere.

8. The method of claim 7, wherein the third operating condition comprises an engine acceleration event, the engine acceleration event determined, with the engine controller, based on a pedal position sensor, and the fourth operating condition comprises an engine temperature below a threshold temperature, the engine temperature determined, with the engine controller, based on an engine temperature sensor.

9. A system, comprising:
an engine having an exhaust manifold;
a turbocharger turbine fluidically coupled to the exhaust manifold via a first passage;
a second passage branching off the first passage upstream of the turbine and having an outlet fluidically coupled to the turbine;
a first three-way valve at a junction between the first passage and the second passage;
at least one aftertreatment device positioned in the second passage;
a second three-way valve positioned in the second passage upstream of the turbine and downstream of the at least one aftertreatment device, the second three-way valve coupling the second passage to atmosphere;
a third passage fluidically coupled to an outlet of the turbine and to the second passage upstream of the at least one aftertreatment device;
a third three-way valve coupling the third passage to atmosphere;
a fourth three-way valve coupling a common exhaust gas recirculation (EGR) passage to a low-pressure EGR (LP-EGR) passage and to a high-pressure EGR (HP-EGR) passage;
a mass airflow sensor coupled to an intake of the engine;
an intake throttle position sensor coupled to an intake throttle valve;
an engine position sensor coupled to a crankshaft of the engine; and
a controller receiving signals from the mass airflow sensor, the intake throttle position sensor, and the engine position sensor, the controller storing instructions executable to:
responsive to a first engine operating condition, determined based on indications from one or more of the mass airflow sensor, the intake throttle position sensor, and the engine position sensor, adjust a position of one or more of the first three-way valve, the second three-way valve, the third three-way valve, and the fourth three-way valve to fluidically couple the first passage to each of the turbine and the at least one aftertreatment device, fluidically couple the second passage to atmosphere, fluidically couple the third passage to the second passage, and fluidically couple the common EGR passage to the HP-EGR passage; and
responsive to a second engine operating condition, determined based on indications from one or more of the mass airflow sensor, the intake throttle position sensor, and the engine position sensor, adjust the position of one or more of the first three-way valve, the second three-way valve, the third three-way valve, and the fourth three-way valve to fluidically couple the second passage to each of the turbine and to atmosphere, fluidically couple the first passage to the second passage, fluidically couple the third passage to atmosphere, and fluidically couple the common EGR passage to the LP-EGR passage.

10. The system of claim 9, wherein to fluidically couple the first passage to each of the turbine and the at least one aftertreatment device, the controller has instructions executable to adjust the first three-way valve to a third position configured to direct a first portion of exhaust gas to the first passage and a second portion of exhaust gas to the at least one aftertreatment device; to fluidically couple the second passage to atmosphere, the controller has instructions executable to adjust the second three-way valve to a first position configured to direct exhaust gas only to atmosphere; to fluidically couple the third passage to the second passage, the controller has instructions executable to adjust the third three-way valve to a first position configured to direct exhaust gas only to the second passage; and to fluidically couple the common EGR passage to the HP-EGR passage, the controller has instructions executable to adjust the fourth three-way valve to a first position configured to direct exhaust gas only to the HP-EGR passage.

11. The system of claim 9, wherein to fluidically couple the second passage to each of the turbine and atmosphere, the controller has instructions executable to adjust the second three-way valve to a third position configured to direct a third portion of exhaust gas to the turbine and a fourth portion of exhaust gas to atmosphere; to fluidically couple the first passage to the second passage, the controller has instructions executable to adjust the first three-way valve to a second position configured to direct exhaust gas only to the second passage; to fluidically couple the third passage to atmosphere, the controller has instructions executable to adjust the third three-way valve to a second position configured to direct exhaust gas only to atmosphere; and to fluidically couple the common EGR passage to the LP-EGR passage, the controller has instructions executable to adjust the fourth three-way valve to a second position configured to direct exhaust gas only to the LP-EGR passage.

12. The system of claim 9, further comprising an exhaust energy recovery system coupled to a battery positioned in the first passage downstream of the first three-way valve and upstream of the turbine.

13. The system of claim 12, wherein the controller has instructions executable to adjust the position of the first three-way way valve to fluidically couple the first passage to the exhaust energy recovery system.

14. The system of claim 9, wherein an inlet of the common EGR passage is coupled to the third passage upstream of the third three-way valve and downstream of the turbine.

15. The system of claim 9, wherein the controller comprises further instructions executable to, responsive to a third engine operating condition, determined based on a pedal position sensor, adjust the position of one or more of the first, second, third, and fourth three-way valves to fluidically couple the first passage only to the turbine, fluidically couple the third passage only to the second passage, fluidically couple the second passage only to atmosphere, and fluidically couple the common EGR passage to the HP-EGR passage.

16. The system of claim 9, wherein the controller includes further instructions executable to, responsive to a fourth engine operating condition, determined based on an engine temperature sensor, adjust the position of one or more of the first, second, third, and fourth three-way valves to fluidically couple the first passage only to the second passage, fluidically couple the second passage only to the turbine, fluidically couple the third passage only to atmosphere, and fluidically couple the common EGR passage only to the LP-EGR passage.

17. A method for operating a vehicle engine, comprising:
flowing exhaust gas from the engine through a first three-way valve placed in a first position, with an engine controller, to a turbine, then to an aftertreatment device, and then to atmosphere; and
responsive to boost pressure above a threshold, adjusting the first three-way valve's position with the engine controller to bypass exhaust gas around the turbine and through the first three-way valve to the aftertreatment device and then to atmosphere, the boost pressure determined with the engine controller via at least one sensor.

18. The method of claim 17,
wherein the flowing exhaust gas from the first three-way valve to the aftertreatment device and then to atmosphere goes directly, without flowing exhaust gas through the turbine, and
wherein adjusting the position of the first three-way valve further comprises adjusting the position of the first three-way valve, with the engine controller, to flow a second portion of exhaust gas through the first three-way valve to the turbine, then from the turbine to the aftertreatment device, then from the aftertreatment device to atmosphere.

* * * * *